United States Patent
Wagner

(10) Patent No.: US 8,577,744 B2
(45) Date of Patent: *Nov. 5, 2013

(54) SYSTEM AND METHOD FOR EFFECTING AUCTION ITEM PAYMENTS THROUGH A NETWORK PORTAL

(75) Inventor: Richard H. Wagner, Norcross, GA (US)

(73) Assignee: Datascape, Inc., Atlanta, GA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 11/646,028

(22) Filed: Dec. 27, 2006

(65) Prior Publication Data

US 2008/0162347 A1    Jul. 3, 2008

(51) Int. Cl.
*G06Q 30/00* (2012.01)
(52) U.S. Cl.
USPC .......................... 705/26.3; 705/37
(58) Field of Classification Search
USPC ........................................ 705/26, 37
See application file for complete search history.

(56) References Cited

U.S. PATENT DOCUMENTS

| | | | |
|---|---|---|---|
| 6,202,054 B1 * | 3/2001 | Lawlor et al. | 705/42 |
| 6,236,990 B1 | 5/2001 | Geller et al. | |
| 6,343,277 B1 * | 1/2002 | Gaus et al. | 705/37 |
| 6,609,113 B1 * | 8/2003 | O'Leary et al. | 705/39 |
| 6,837,436 B2 | 1/2005 | Swartz et al. | |
| 6,853,977 B1 | 2/2005 | Niwa | |
| 6,941,375 B1 | 9/2005 | Govindarajan et al. | |
| 6,970,855 B2 | 11/2005 | Das et al. | |
| 2002/0095376 A1 * | 7/2002 | Likourezos et al. | 705/40 |
| 2003/0014317 A1 | 1/2003 | Siegel et al. | |
| 2003/0069922 A1 | 4/2003 | Arunachalam | |
| 2003/0195843 A1 * | 10/2003 | Matsuda et al. | 705/39 |
| 2004/0181454 A1 | 9/2004 | Manno | |
| 2005/0033645 A1 | 2/2005 | Duphily | |
| 2005/0138648 A1 | 6/2005 | Ahmed et al. | |
| 2005/0149543 A1 | 7/2005 | Cohen et al. | |
| 2005/0154670 A1 | 7/2005 | Heitz et al. | |
| 2005/0209961 A1 | 9/2005 | Michelsen et al. | |

OTHER PUBLICATIONS

Moneybookers (http://web.archive.org/web/20050207195418/http://www.moneybookers.com/app/help.pl?s=escrow) Feb. 7, 2005.*

Peirce, Michael, and O'Mahony, Donal, "Scaleable, Secure Cash Payment for WWW Resources with the PayMe Protocol Set," Jul. 1995, http://www.w3.org/Conferences/WWW4/Papers/228/, 17 pages.

* cited by examiner

*Primary Examiner* — Narayanswamy Subramanian
*Assistant Examiner* — Asha Puttaiah
(74) *Attorney, Agent, or Firm* — Maginot, Moore & Beck, LLP

(57) ABSTRACT

A merchant/seller portal enables sellers of auction items on Internet auction sites to obtain cash payments from buyers identified only by their buyer pseudonyms. The portal includes an open network interface, a seller database in which data associated with a seller are stored, a buyer manager for verifying auction purchase data received from a merchant terminal, an auction site manager for verifying auction transaction data with an auction site server, and an auction payment manager for communicating data messages with an auction payment server to transfer funds for a verified auction transaction.

19 Claims, 13 Drawing Sheets

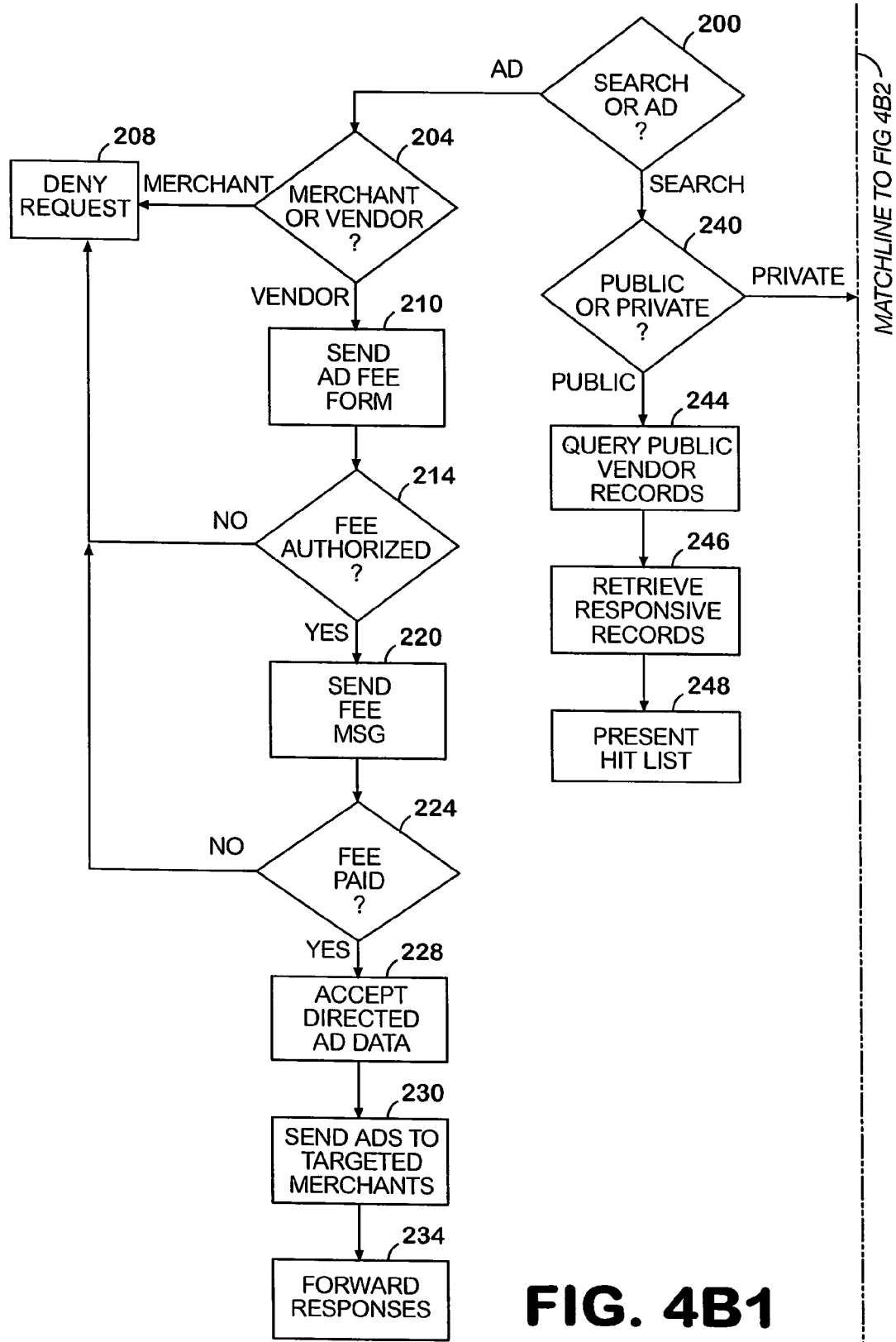
FIG. 4B1

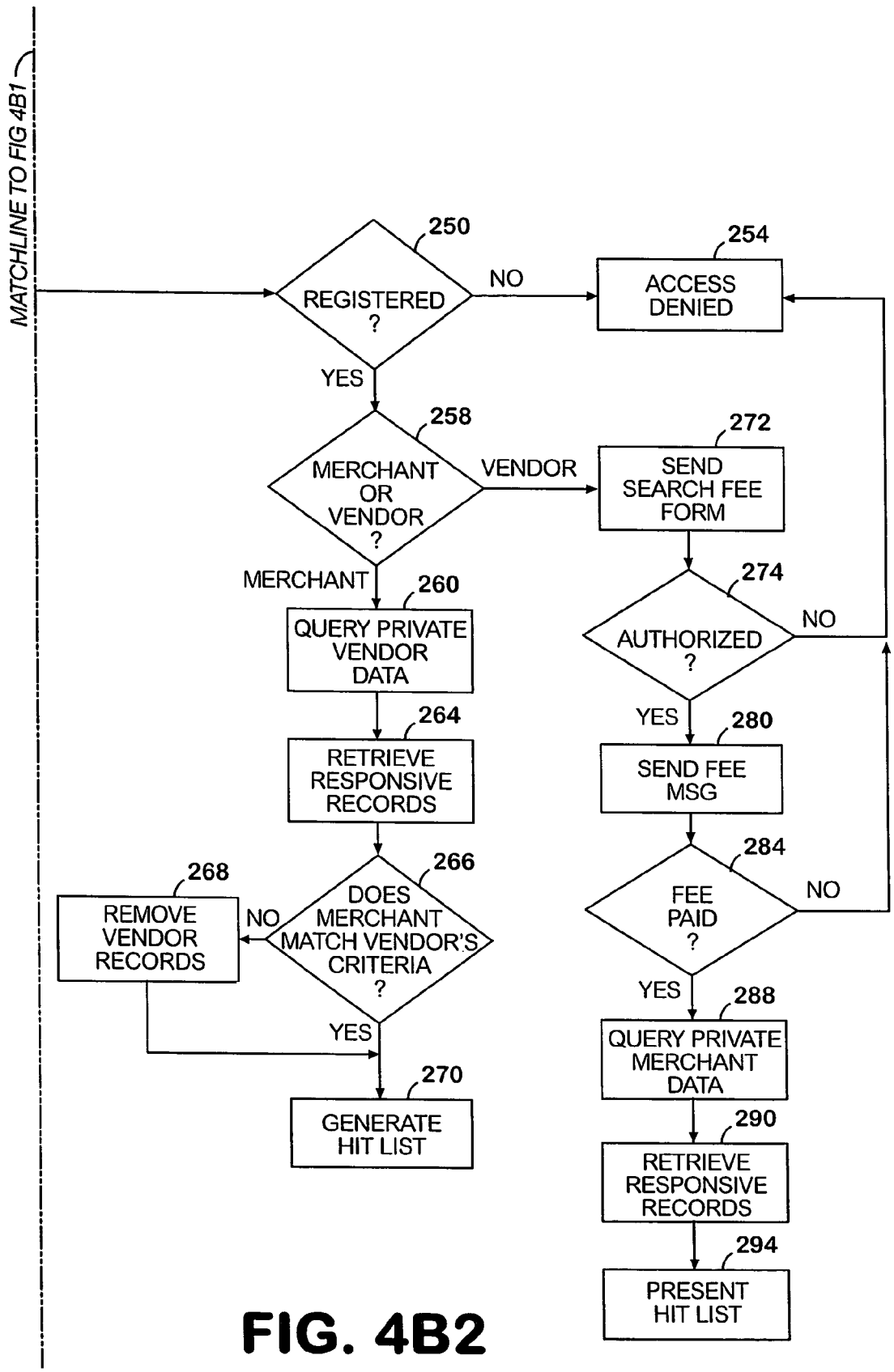
FIG. 4B2

SYSTEM AND METHOD FOR EFFECTING AUCTION ITEM PAYMENTS THROUGH A NETWORK PORTAL

PRIORITY CLAIM

This application claims priority from pending and commonly assigned U.S. patent application Ser. No. 11/393,134, which is entitled "System And Method For Facilitating Transactions Through A Network Portal," and which was filed on Mar. 30, 2006.

TECHNICAL FIELD

This disclosure relates generally to portals accessible via computer communication networks, and, more particularly, to portals for facilitating payment transactions.

BACKGROUND

The Internet has enabled significant electronic commerce to develop over the last two decades. Most typically, this e-commerce is supported by a website that transmits information about products or services being offered for sale and that processes orders and payments for sales of those products and services. The website is implemented with a computer, typically called a server, that may be coupled to one or more databases or other computers executing support applications. The server may be coupled to the databases and supporting computers through a common gateway interface or CGI. The data regarding the products and services are contained within files transmitted over a global open computer network known as the Internet. These files may be HTML and XML documents, for example, that are sent to client programs executing on customer computers that are coupled to the Internet. These client programs may be application programs called browsers. The files transmitted to the client programs may also include forms that have objects embedded within them. These objects may be used to communicate information between the client program and the website. This bi-directional communication of information enables a user to shop for goods and services, place an order with a website for goods and/or services, submit payment for the order, and arrange shipping to the desired recipient.

This form of e-commerce has been greatly enhanced by search engines. Search engines are implemented with significant computer resources that are coupled together and made available at a single address on the Internet. The databases at the search engine contain metadata that has been obtained from websites on the Internet. The computer resources at a search engine process an unstructured request by a user to provide a user with a hit list of websites that contain metadata related to the user's query. The search engine provides a short excerpt or summary of the information available at a website contained within a hit list to indicate the reason that the website was selected for inclusion in the hit list. The user may explore the websites provided in a hit list without losing the hit list generated by the search engine. Thus, the user is able to sift through a hit list and evaluate multiple sources for the goods and services being sought by the user.

Being near the top of a hit list is important for sales. Most e-commerce consumers do not exhaustively search the entries in a hit list. Rather, many consumers make a decision after visiting five to ten websites. Navigating through a website can be time consuming and, depending on the bandwidth of the communication conduit to the consumer's computer and the processing resources of the website and the consumer's computer, can be a tedious and frustrating journey. To improve the likelihood that a seller's website is brought to a consumer's attention sooner rather than later in a hit list, portals were developed. Portals enable multiple providers of goods and services to be presented to a user at a single website address. That is, a portal is an electronic version of a mall or shopping center. The diversity of the goods and services offered through the portal increases the likelihood that the metadata for the portal satisfies a user's query and that the portal address is displayed in a hit list. Moreover, the concentration of related websites available through a portal may score higher in the search engines criteria for prioritizing the hit list entries. This higher score enables the portal address to have a greater chance of being ranked highly in a hit list generated by a search engine than a website for a single source of goods or services.

Other variations in e-commerce have arisen as well. One variation is the electronic auction. In one version of the auction, sellers list items with an electronic auction house. The electronic auction house has a single Internet address and a search engine for the site. The search engine enables a potential buyer to obtain a list of items being offered for sale. When an item is selected from the list, a picture of the item is displayed along with some information about the item provided by the seller. Additionally, a rating for the seller may be provided. This information may be used by the buyer to assess the risk that the seller's representations are not completely accurate or that the seller does not timely deliver the item. After viewing the item and related information, the buyer may enter a bid along with identifying information, such as an email address. At the expiration of the auction period for the item, the highest bidder is notified by email that he or she has won the item. The buyer then needs to pay for the item. Some buyers provide payment by mailing a check or money order to the seller. Others use credit cards or a third party payment service. A third party payment service requires a buyer to establish an account with the payment service. Along with personal identification information, the buyer provides data to identify a payment source, such as a credit card, debit card, or other demand account associated with the buyer. After the seller receives payment, the item is shipped to the buyer.

Another electronic marketplace accessible over the Internet solicits data from users and then sells access to the database compiled from the collected data. For example, MONSTER.COM® website solicits resumes from Internet users and compiles those resumes into a database. Employers register with the website operator and pay a fee to search the database for qualified applicants and to post job openings in the operator's database. Public users search the job postings database and submit their resumes. The resumes submitted for a job opening are filtered by the website operator with an employer's criteria for applicants before being presented to a posting employer. In this type of electronic market, the website operator collects a fee for building the resume database and for filtering responses to an employer's job postings.

In the transaction systems discussed above, constraints exist that restrain the robustness of the commerce implemented with such systems. For example, the electronic auction is hampered by the inability to accept cash payments. Literally, millions of persons wanting to remain anonymous do not establish bank accounts or credit card accounts in this country. Consequently, these persons do not have a relationship with a bank so they cannot use electronic funds transaction messages to settle an order. Without a checking account, they are unable to write and send checks to the seller to consummate a sale. Although a money order may be used to pay a seller, a risk exists that a money order, or any other paper instrument, sent by mail may be lost or that the seller will simply cash the paper instrument without sending the goods. Additionally, large volume vendors incur a significant expense to process paper instruments mailed to the vendor for payment of goods. What is needed is a way to pay cash for goods over the Internet without requiring a buyer to have a relationship with a bank or other financial institution to obtain a paper instrument and mail it to the seller.

Even retail sites use the Internet for transactions. For example, point-of-sale (POS) terminals may be used to communicate with vendor websites to facilitate sales of secure items. One type of secure item that may be sold using a POS terminal communicating over the Internet is a calling card that is dispensed from a kiosk or purchased and activated at a convenience store counter. Upon presentation of payment, a cashier or buyer navigates through a set of menus and populates forms with data that are sent to the vendor website. In response to the data retrieved from the transmitted form, the vendor site issues an activation code for a calling card account that is transmitted to the kiosk or POS terminal. To obtain these agents for sales of calling cards, telecommunications carriers solicit bids by sending sales agents to the managers and/or owners of convenience stores and other establishments to negotiate and sign contracts for governing the sales, loss, and commissions for the phone cards. Once the contracts are finalized and executed, the carrier installs proprietary terminals for managing the calling card transactions in a store or multiple branches. The sales location then collects payments for the cards and remits the portion of the payment due the carrier under the agreement.

The resources to address the need for personally soliciting agents to handle in-store sales can be significant for website vendors. The maintenance of a sales force and the need to install proprietary terminals or software for managing the sales eats into profit margins for this intensely competitive market. The expense of finding a new agent, removing the proprietary terminals, and installing them in a new location encourages a vendor to tolerate poorly performing agents rather than to terminate the agent and find another agent. Likewise, retail agents desire competition for their distribution services and want to know other possible vendors that could replace poorly performing vendors. What is needed is an efficient method for securing sales agents located at "brick and mortar" locations. What is needed is a way to facilitate interaction between vendors and their sales agents located at "brick and mortar" locations. What is need is a way of providing sales agents at retail locations with information regarding vendor candidates for the goods and services that the agent wants to offer at the retail location.

Another limitation of previously known electronic markets is the absence of information regarding business opportunities and partners for the retail market. Requests for proposals and bid requests are not available over the Internet, except possibly by discovering a website posting a business opportunity with the aid of a search engine. This type of search requires knowledge of an industry to locate a potential business opportunity candidate. Search engines are designed to promote advertising for consumers so the hit lists generated in an effort to locate business opportunities are not likely to rank the most promising leads for business ventures highly. Moreover, these types of searches use keywords or metadata and do not support the use of structured search terms, business metric data, or business profile data. Additionally, the quality of the information exchanged in this public forum is generally unreliable and requires verification. What is needed is a forum for businesses to solicit and obtain business partners based on the exchange of reliable information without requiring extensive out-of-network research.

SUMMARY

An auction payment support portal enables sellers of auction items on Internet auction sites to obtain cash payments from buyers identified only by their buyer pseudonyms. The portal includes an open network interface, a seller database in which data associated with a seller are stored, a buyer manager for verifying auction purchase data received from a merchant terminal, an auction site manager for verifying auction transaction data with an auction server, and a transaction payment manager for communicating data messages with an auction payment service server to transfer funds for a verified auction transaction.

A method may be implemented by an auction payment support portal that enables buyers to pay for auctioned items with cash. The method includes storing data associated with a seller in a database, verifying auction purchase data received from a merchant terminal, verifying auction transaction data with an auction site server, and communicating data messages with an auction payment service server to transfer funds for a verified auction transaction.

BRIEF DESCRIPTION OF THE DRAWINGS

FIGS. 4B1 and 4B2 depict a flow diagram of an exemplary process for implementing the search and advertise function shown in FIG. 4A.

DETAILED DESCRIPTION

Figure 1:
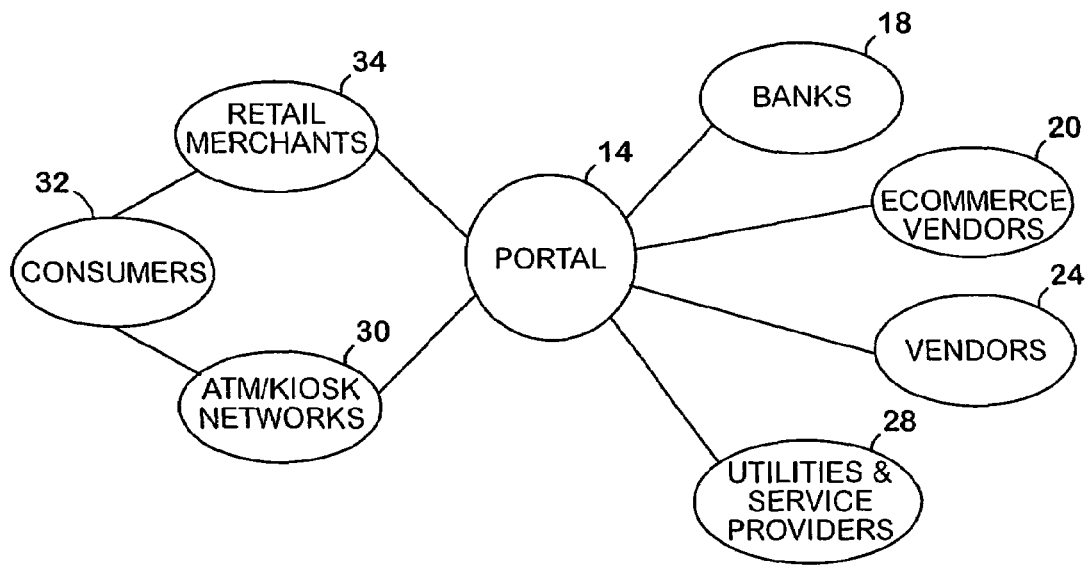
FIG. 1 is a topological view of a network for implementing a business partner portal disclosed herein.

FIG. 1 shows topology of a network 10 that incorporates a merchant/vendor portal. The portal 14 is coupled as an interchange between banks 18, e-commerce vendors 20, vendors 24, utilities and service providers 28, ATM/kiosk networks 30, and retail merchants 34. The portal 14 provides a number of primary functions to support transactions with consumers 32. Exemplary functions include search and advertise, member enrollment, vendor approval, merchant deployment, consumer sales and payments, settlement/commissions/convenience fees and reporting, and member ratings and feedback. These functions are described in more detail below.

Figure 2:
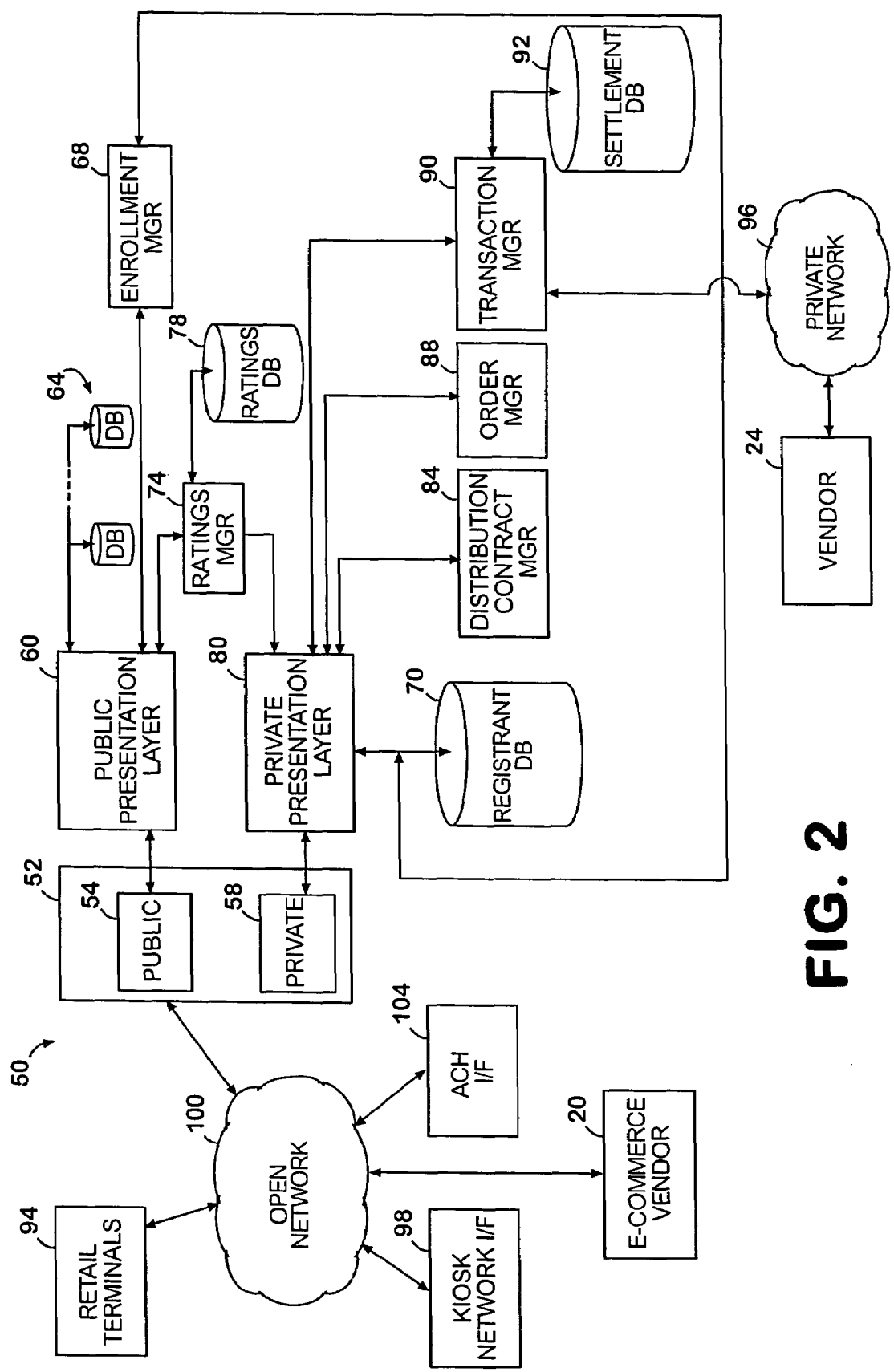
FIG. 2 is a block diagram of a system that may be used to implement the business partner portal of FIG. 1.

An exemplary system that may be used to implement the portal 14 is shown in FIG. 2. The system 50 includes a network communication interface 52 that may include a public party interface 54 and a registered party interface 58. The public party interface 54 may be coupled to a public presentation layer 60. The public presentation layer 60 is coupled to one or more databases 64 to provide content to users through the public interface 54. Also, an enrollment manager 68 may be coupled to public presentation layer 60 to obtain data for registering vendors and merchants with the portal 14. Data for the users that have been accepted as members of the portal 14 are stored by the enrollment manager 68 in the registrant database 70. The public presentation layer 60 may also be coupled to a ratings manager 74. The ratings manager 74 receives ratings for vendors through the public presentation layer 60 and stores the rating data in a ratings database 78.

Ratings manager 74 may also be coupled to the registered party interface 58 through the private presentation layer 80. Through this more secure communication path, the ratings manager 74 receives rating data for merchants from vendors and these data are stored in the ratings database 78. Additionally, the vendors may access these merchant rating data only through the registered party interface 58 and the private presentation layer 80. The private presentation layer 80 also coupled the registered party interface 58 to a distribution contract manager 84, an order manager 88, and a transaction manager 90. The distribution contract manager 84 communicates with a business partner candidate by sending a distribution contract to a business partner candidate, verifying the data in the distribution contract form, and submitting the distribution contract data to a vendor for acceptance. The order manager 88 communicates with a consumer at a registered terminal through the private presentation layer 80 to generate and evaluate messages associated with the placing of an order for goods or services from a vendor. The transaction manager 90 communicates with a merchant, bank(s), and a vendor to generate appropriate messages to post a transaction to a vendor or bank, void a transaction, inquire into an account, settle a transaction, pay commissions and convenience fees, or report settlement to the appropriate parties, although the order manager may be used for some or all of these messages as well. Data generated by the transaction manager 90 regarding transactions are stored in settlement database 92.

The system 50 is coupled to registered retail terminals 94 and customer kiosks 98 through an open network 100. The retail terminals may be point-of-sale (POS) terminals or computers, such as personal computers, on which application programs execute that support transactions with the portal 14. Retail terminals also include PDA and wireless telephone devices that have the capability of communicating data over an open network. These devices include a portable integrated circuit having a processor and memory space for executing application programs. Examples of such integrated circuits include a subscriber identity module (SIM) for use in a GSM network or a user identity module (UIM) for use in a CDMA network. Additionally, smart cards may be carried by authorized users at a retail merchant for use at a registered terminal. The smart card communicates with a POS terminal or PC in a known manner. These portable devices and smart cards have the capability of hosting and executing merchant application software. Merchant application software, either executing on one of these portable devices, a POS terminal or PC, or in a smart card unit, is used to store and manage data, such as merchant identifiers and vendor identifiers, authenticate users of registered terminals, authenticate registration of a retail terminal, encrypt data being communicated, and manipulating data for posting a transaction to the portal. These terminals, computers, and/or portable devices are registered with the portal 14 by the enrollment manager 68 as described more fully below. The kiosks may either be kiosks owned and operated by a merchant or by a vendor.

The open network may be any computer communication network that supports an open network protocol. The open network 100 may also be coupled to the automatic clearinghouse (ACH) network 104 that is well known and used for the communication of electronic fund transaction (EFT) messages between financial institutions. Alternatively, the portal 14 may be coupled to the ACH network 104 through a point-to-point communication path. Portal 14 may communicate with retail terminals 94, e-commerce vendors 20, a kiosk interface 98, and an automatic clearinghouse interface 104 over the open network 100 using known encryption methods, for example. Additionally, portal 14 may also communicate over one or more private networks. Thus, FIG. 2 also shows the transaction manager being coupled to a private network 96 for communications with a vendor 24.

Figure 3A:
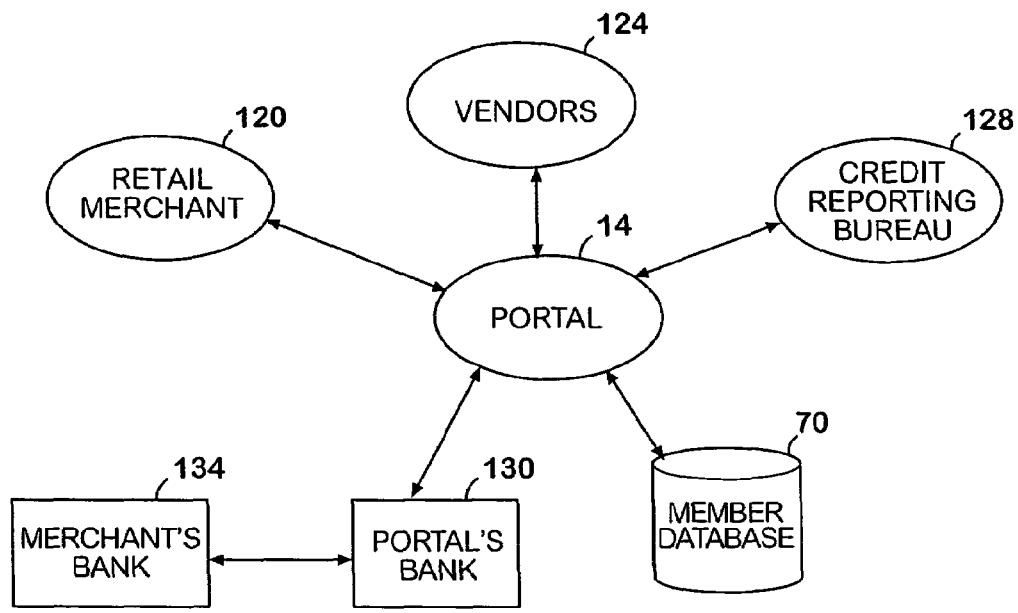
FIG. 3A is a topological view of a data flow through the network of FIG. 1 for enrolling a business on the portal of FIG. 1.

A diagram of the member enrollment function for the portal 14 is shown in FIG. 3A. To perform this function, portal 14 communicates with retail merchants 120 and vendors 124. The retail merchant group in FIG. 3 includes the retail merchants 34 and the owners/operators of the ATM/kiosk networks 30 shown in FIG. 1. Likewise, the vendor group 124 includes the e-commerce vendors 20, the vendors 24, and the utilities and service providers 28 depicted in FIG. 1. The merchants and vendors may apply for admission to the portal 14 through the public interface 54. The portal 14 communicates with the retail merchants 120 and the vendors 124 to build the member or registrant database 70. During the enrollment function, the portal 14 receives authorization from an applicant to obtain a credit report and the credit report for the applicant received from the credit reporting bureau is stored in the registrant database 70 in association with the applicant's other data. The portal 14 may generate EFT messages for a membership fee and the fee message is sent through the ACH network 104 to the portal's bank 130. The bank 130 generates EFT messages to obtain the membership fee from the applicant's bank 134 and return a remittance message to the portal 14.

Figure 3B:
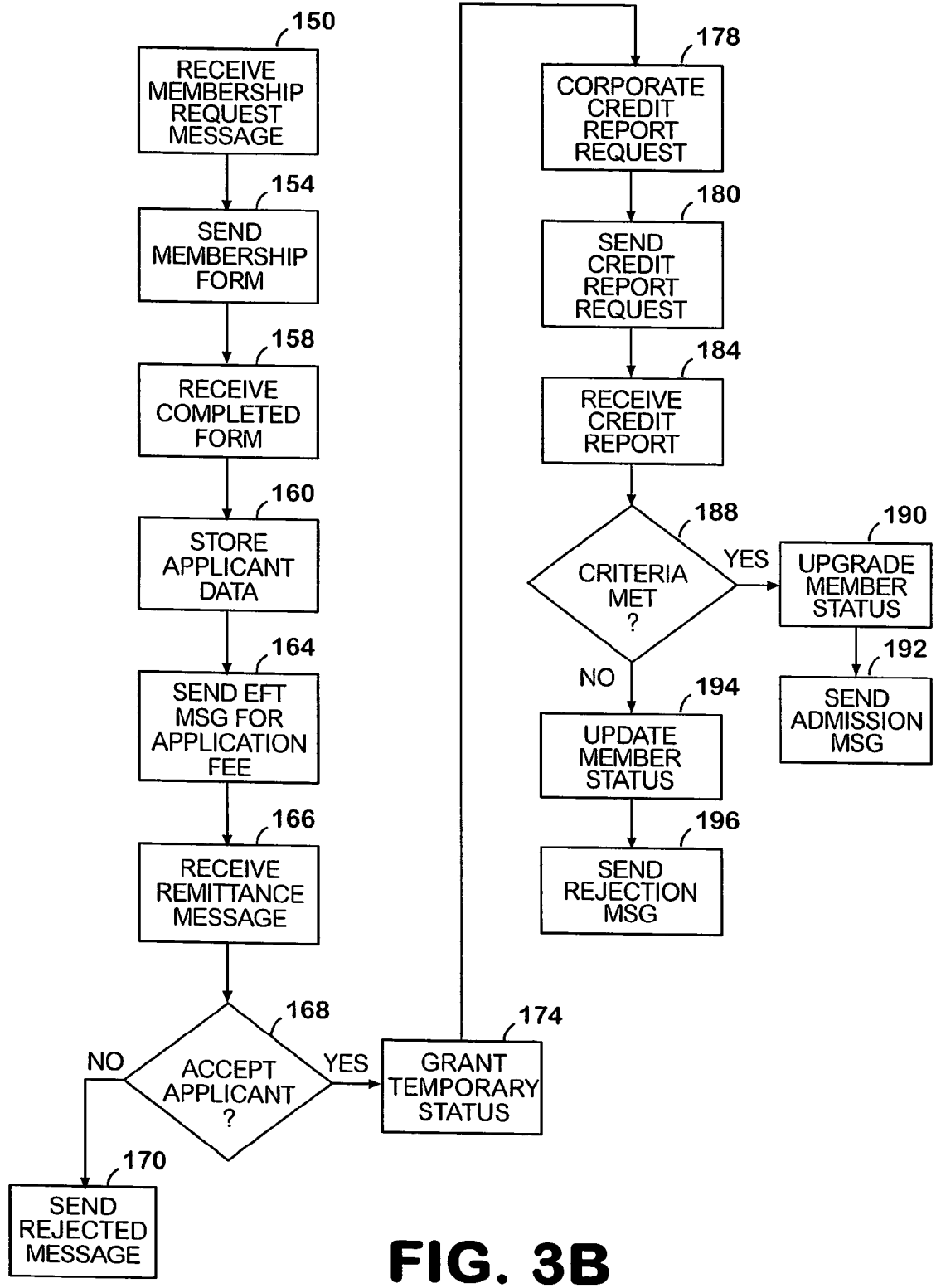
FIG. 3B is a flow diagram of an exemplary process for implementing the enrollment function shown in FIG. 3A.

An exemplary method for performing the membership function is shown in FIG. 3B. The function includes the portal receiving from a merchant 120 or a vendor 124 a membership request message through the public network interface 54 (block 150). The enrollment manager 68 retrieves a membership request form that is returned to the applicant (block 154). The applicant populates the form with the requested data and returns the form to the portal (block 158). These data include data identifying the applicant, the applicant's business, and the business location, among other possible data items.

As noted above, the applicants are evaluated before being admitted to membership in the portal. To this end, the membership form includes an object for obtaining basic applicant data as well as objects for obtaining authorizations for a credit report and for payment of an application fee. The enrollment manager uses the data in the returned form to build database records for the applicant in the registrant database (block 160). The enrollment manager also generates an EFT message for the authorized amount and sends the message to the portal's bank for settlement with the applicant's bank (block 164). A returned remittance message is evaluated (block 166) and the enrollment function determines whether the application fee was paid (block 168). If the fee was not paid, a membership denied message is generated and sent to the applicant (block 170). If the fee was paid, temporary membership status is granted and the applicant's database records are updated to reflect the temporary status (block 174). The enrollment function then generates a credit report request (block 178) and sends it to the credit reporting agency 128 (block 180). Upon receipt of the credit report (block 184), the enrollment function determines whether the applicant's credit score meets the portal's criteria for membership admittance (block 188). If it does satisfy the criteria, the applicant's records are updated to indicate the applicant as been admitted as a member (block 190). An admission message is generated and sent to the applicant (block 192). The admission message includes a registration number for the newly admitted member. If the credit score does not meet the portal's admittance criteria (block 188), the applicant's database records are updated to indicate admission was denied (block 194) and a membership denied message is generated and sent to the applicant (block 196). Alternatively, such a member may be allowed with restrictions, such as limited credit or pre-funded credit. In this manner, the enrollment function evaluates and selectively admits merchants and vendors to the membership of the portal.

Figure 4A:
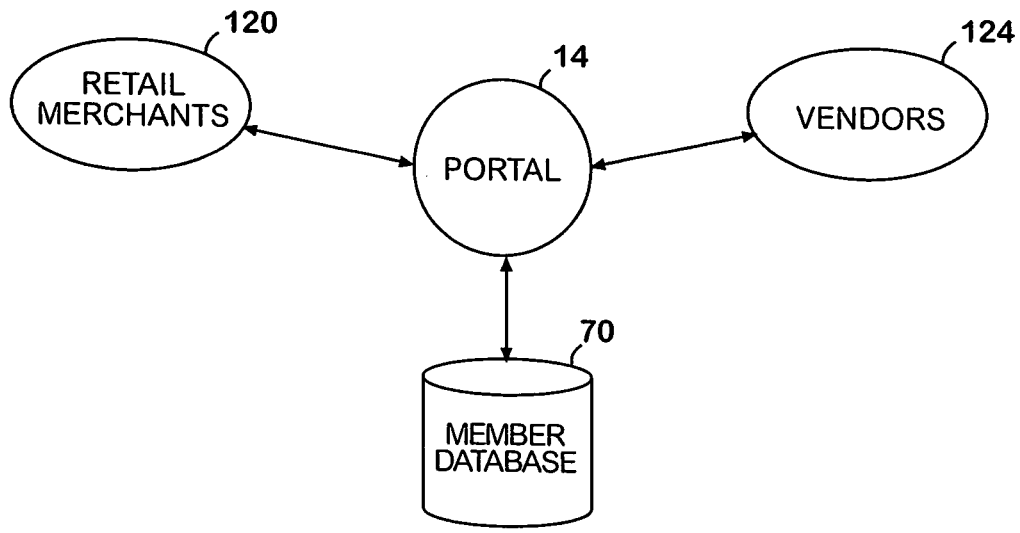
FIG. 4A is a topological view of a data flow for searching and advertising on the business partner portal of FIG. 1.

A diagram of the search and advertising function for the portal 14 is shown in FIG. 4A. To perform this function, portal 14 communicates with retail merchants 120 and vendors 124. Merchants may use the search and advertising function to query the portal for goods and services offered by particular registered vendors or to query the portal for the identification of registered vendors that offer particular goods or services. These queries may be processed through the public network interface and the querying merchant need not be a member of the portal. Pricing information for goods or services available from one or more particular registered vendors may be handled through the public or registered interfaces, depending on the preferences of the portal and its members. If pricing information is not considered sensitive information, a merchant may obtain it from the portal through the public network interface. If the pricing information is deemed sensitive, the merchant may be required to become a member of the portal. In this scenario, the merchant is routed to the enrollment function for membership processing. Once the merchant is enrolled and has received a registration number, the merchant is able to communicate with the portal through the registered party interface to search the pricing information associated with the vendors identified in a merchant's query. The pricing data is stored in association with the vendor in the registrant database 70.

Registered vendors may also search the database 70 for merchants that are business partner candidates. To perform this type of search, a registered vendor logs onto the portal through the registered party interface. Once the vendor's membership is confirmed, the vendor requests access to the database for a business partner candidate search. The portal responds by sending the vendor a form for authorization to obtain a search fee from the vendor's bank. Once the form is returned with authorization granted, the portal generates messages for obtaining the search fee using the bank data stored for the vendor in the registrant database. The messages are sent to the portal's bank for remittance to the portal's bank account. Once a remittance message is received indicating the search fee has been credited to the portal's account, the vendor is authorized to search the registrant database for business partner candidates. Alternatively, the portal may evaluate credit data stored in association with the vendor and grant the vendor access before receipt of the remittance message.

A vendor that has paid the search fee may search the registrant database for a business partner candidate. The vendor may use a variety of search criteria, such as consumer demographics for an area, credit worthiness, merchant profile, number of stores, location of stores, merchant rating, years in business, sales volume, retail industry SIC code, and product types, for example. In one scenario, a jewelry wholesaler may search the database for a retail merchant in a particular zip code known to have a high income per capita in a major metropolitan area with high volume traffic parameters. Once a vendor has searched the database and the portal has generated a hit list of business partner candidates that match the vendor's criteria, the vendor may determine whether any of the candidates are to be offered a business partner opportunity.

An exemplary method for performing the search and advertise function is shown in FIGS. 4B1 and 4B2. The function determines whether a search or directed advertising is being requested (block 200). For directed advertising, the function determines whether the requester is a merchant or a vendor (block 204). If the requester is a merchant, the directed advertising request is denied (block 208). If the requester is a vendor, a form is sent to the requester to obtain authorization for an advertising fee (block 210). Once the form is returned, the function determines whether the authorization was received (block 214). If it was not, the request is denied (block 208). If authorization for fee payment was received, messages are generated and sent to the portal's bank for obtaining fee remittance (block 220). If the responsive remittance message is evaluated to determine whether the fee was paid (block 224). If the fee was not paid, the request is denied (block 208). If the fee is paid, the advertisement and directed advertising data is accepted (block 228). The advertisement and identified merchant data are used to send the advertisement to the registered merchants identified by the vendor (block 230). One way that vendors may identify merchants for advertising is to use a hit list from a prior search stored in the vendor's profile. The vendor may also identify merchants for directed advertising by providing a set of search criteria that the portal uses to perform a merchant search (discussed below) to generate a hit list. The hit list may then be used to identify the merchants for the directed advertising. Positive responses to the directed advertising are forwarded to the vendor (block 234).

If the search and advertise function determines the request is a search request, the function parses the query to determine whether it is a public or private query (block 240). If it is a public request, it is a request from a merchant to search the publicly available vendor records in the registrant database for locating vendors or to identify the goods or services available from the vendor. The search criteria that a merchant may use may include vendor rating, DUN & BRADSTREET® rating, credit score, industry SIC code, products, services, pricing, commissions, taxes, and convenience fees. The query is used to interrogate the registrant database for responsive records from the publicly available data for registered vendors (block 244). The responsive records are retrieved (block 246) and presented in a hit list to the requesting merchant (block 248). In the search request, a merchant may specify a period of time for search activity. In response, the portal performs the search on a daily or other periodic basis during the specified time. This enables the merchant to be notified of new vendors joining the portal that meet the merchant's search criteria.

If the query requires data from the restricted data stored in the registrant database, the function determines whether the requester is a registered member (block 250) and, if not, access to the restricted portion of the database is denied (block 254). If the requester is a member, the function then determines whether the registered member is a merchant or a vendor (block 258). A merchant's query is for pricing or other competitive sensitive information stored in association with a vendor. The query is used to interrogate the registrant database for responsive records from the restricted data for the vendors identified by the query (block 260). The responsive records are retrieved (block 264) and the vendors' profiles checked to determine whether the vendor is included in the hit list (block 266). In a vendor's profile, the vendor may store one or more merchant criteria. Responsive vendor records associated with a vendor that specified criteria not met by a merchant's profile are removed from the responsive records for the search (block 268). Otherwise, the vendor's records are removed from the responsive records. The vendor records responsive to the merchant's search query and that are not excluded by the vendor's criteria for merchants are presented in a hit list to the requesting merchant (block 270).

A vendor's request for searching restricted information associated with merchants is a query for business partner candidates. For this type of query, the function sends a form to the requesting vendor to obtain authorization for a search fee (block 272). Once the form is returned, the function determines whether the authorization was received (block 274). If it was not, the request is denied (block 254). If authorization for fee payment was received, messages are generated and sent to the portal's bank for obtaining fee remittance (block 280). If the responsive remittance message indicates the fee was not paid (block 284), the request is denied (block 254). If the fee is paid, the vendor's query is used to interrogate the registrant database for responsive records from the restricted data for the merchants meeting the criteria in the query (block 288). The responsive records are retrieved (block 290) and presented in a hit list to the requesting merchant (block 294). The vendor may also store the search criteria as merchant criteria. The vendor may also specify a time period for the search so it is conducted periodically before the hit list is generated and provided to the vendor. Specifying a time period enables a vendor to detect new merchants that satisfy the search criteria during the specified time period.

Figure 5A:
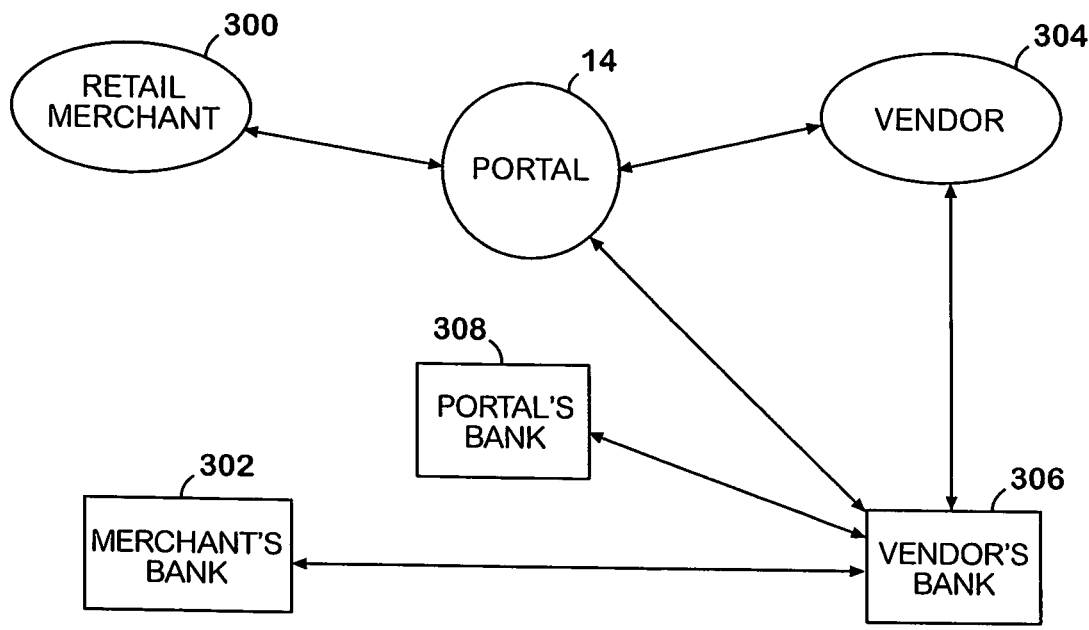
FIG. 5A is a topological view of a data flow for registrant enrollment on the business partner portal of FIG. 1.

A diagram of the vendor approval function for the portal 14 is shown in FIG. 5A. To perform this function, portal 14 coordinates communication between a retail merchant 300 and a vendor 304. The vendor initiates the vendor approval function. This initiation may result from a vendor selecting one of the merchants in a hit list generated from a business partner candidate search. Alternatively, a merchant may have joined the portal and searched for a vendor with acceptable prices for goods. Such a merchant may submit a request for a business opportunity with the vendor, either within the portal or directly through an email or the like. Once a vendor decides to explore a business opportunity with a merchant, the vendor logs into the portal through the registered party interface and communicates with the distribution contract manager. The vendor identifies a merchant as a business partner candidate and indicates whether any of the terms in a particular distribution contract stored in association with the vendor in the restricted portion of the registrant database are to be modified. Once the final form of the contract is established, the distribution contract manager sends the distribution contract to the email address associated with the merchant in the registrant database. The merchant indicates in a responsive message whether the contract is acceptable and, if not, which terms require modification. The contract manager submits the response to the vendor. The vendor then either accepts or rejects the contract. If the contract is accepted, the contract may be electronically signed by the parties. An accepted contract is stored in the registrant database to govern future transactions between the vendor and the merchant. The terms of the accepted contract are used to generate the EFT and settlement messages for fund transfers between the merchant's bank 302, the vendor's bank 306, and the portal's bank 308. If the contract is rejected, the vendor may further negotiate the agreement or attempt to establish a contract with another registered merchant.

Figure 5B:
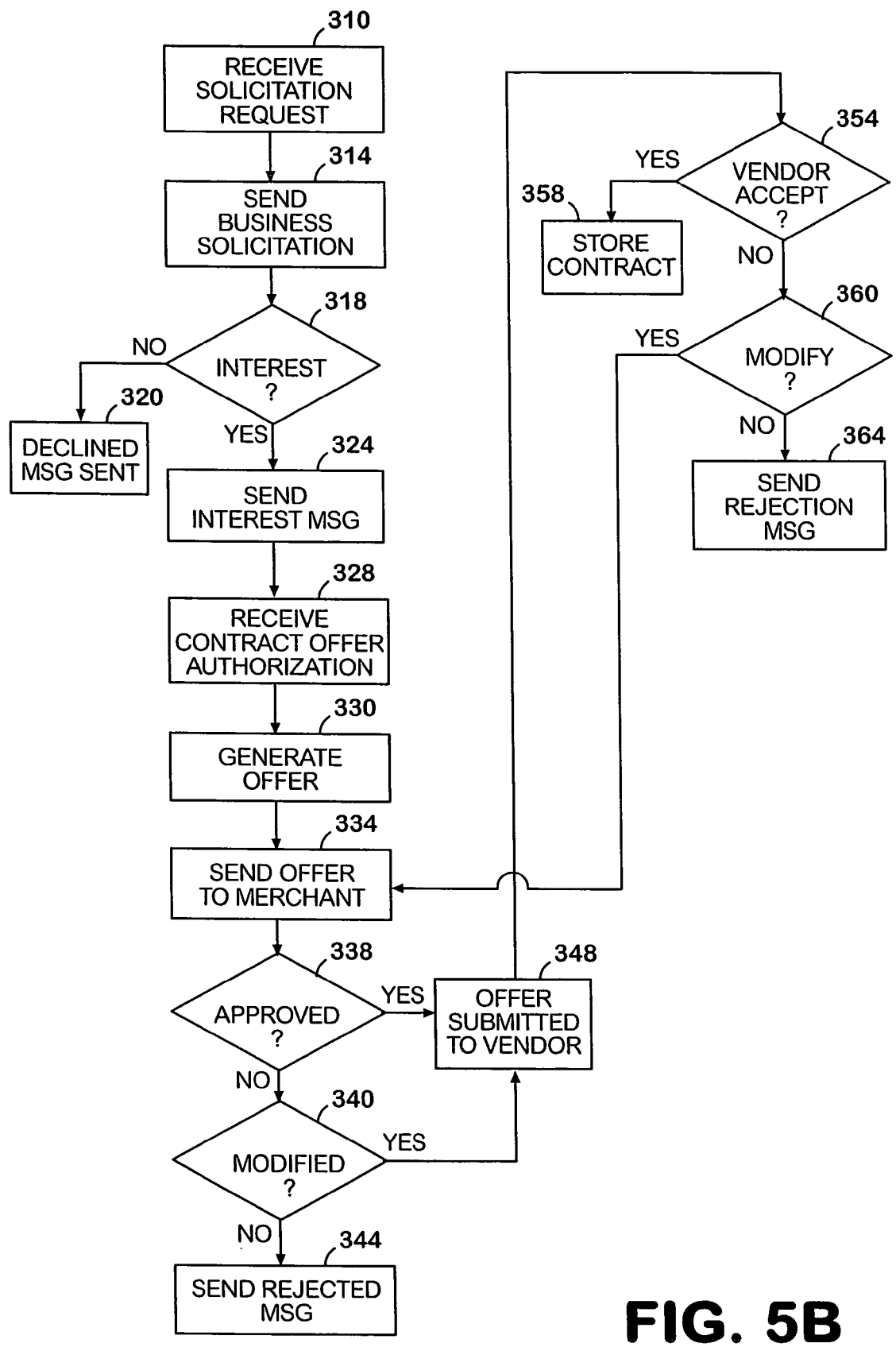
FIG. 5B is a flow diagram of an exemplary process for implementing the business solicitation function shown in FIG. 5A.

An exemplary method for performing the vendor approval function is shown in FIG. 5B. The function receives a request for business solicitation from a vendor (block 310). A business solicitation is generated and sent to the merchant identified in the business solicitation request (block 314). The function determines whether the response indicates an interest in the solicitation (block 318). If no interest is indicated, a message informing the vendor that the solicitation was declined is generated and sent (block 320). Otherwise, an interest message is generated and sent to the vendor (block 324). The function receives a message from the vendor authorizing the presentation of a distribution contract to the merchant (block 328). In response, the distribution contract manager generates a distribution contract offer using the identification data for the merchant and the vendor, the distribution contract associated with the vendor, and the term modifiers, if any, sent with the authorization message (block 330). The contract offer is then sent to the merchant (block 334). The merchant's response is parsed to determine whether the merchant returned the contract offer for submission to the vendor as sent (block 338), with modified terms (block 340), or rejected for submission (block 344). If the offer was submitted as sent or with modified terms, a contract offer submission is generated and sent to the vendor (block 348). Otherwise, a message is generated and sent to the vendor indicating the merchant is not interested in submitting a contract offer (block 344). The vendor's response to a contract offer is parsed to determine whether the contract offer was accepted by the vendor (block 354). If it was, the contract is stored in the registrant database for governance of transactions between the vendor and the merchant (block 358). If the vendor's response indicates modification of the offer's terms are being extended (block 360), negotiation of the contract offer terms may continue through the distribution contract manager until the contract offer is accepted or rejected (blocks 334-364). Otherwise, a message indicating the vendor's rejection is generated and sent to the merchant (block 364).

Following vendor approval of a merchant, a merchant deployment function is performed to register the terminals, computers, and/or portable devices associated with the merchant for transactions. In this function, the retail merchant sends identifying data for each POS terminal, PC, smart card, PDA, wireless telephone, or other portable device that may be used to place orders for a vendor's goods or services. Additionally, the merchant submits user identification and passwords for personnel authorized to perform transactions for a vendor's goods or services. These data are stored in association with the registered and approved merchant. A merchant may also identify an administrator who is authorized to change the approved user list for a merchant and to change passwords for the approved users. The portal 50 generates registration data that is returned to a terminal being registered. This registration data may be stored in the data registry of the terminal or portable device or in some other memory associated with the terminal or portable device. The registration data for the terminal or portable device is sent to the portal for verification of the terminal or portable device registration during execution of a transaction.

Figure 6:
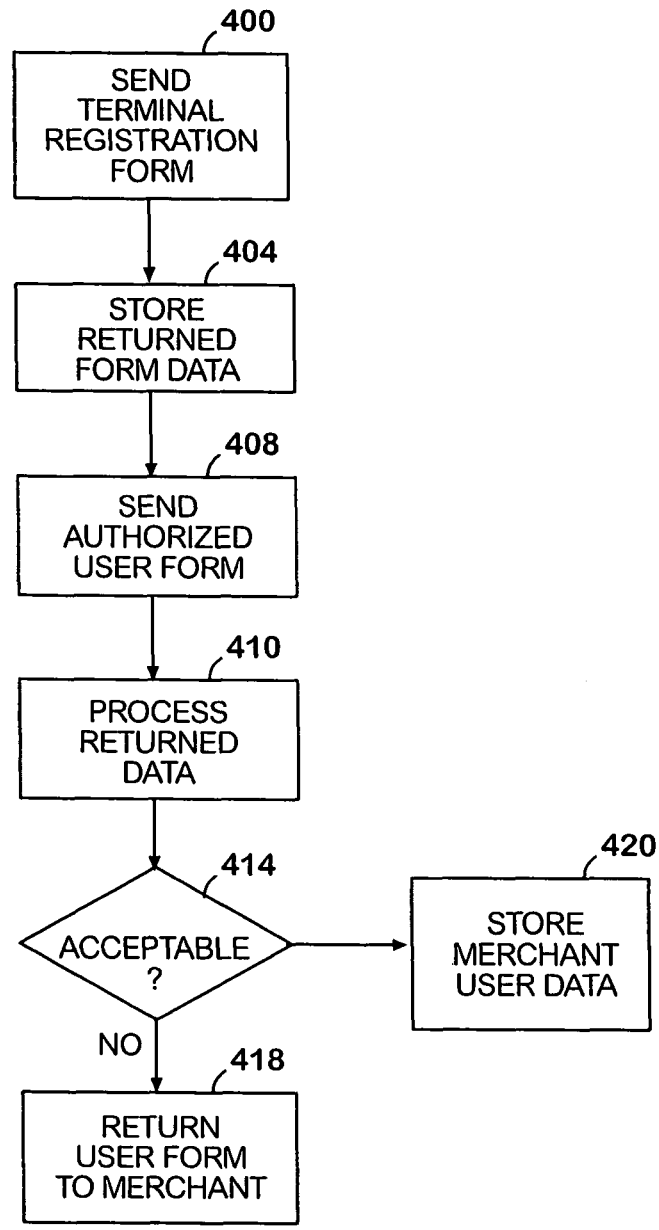
FIG. 6 is a flow diagram of an exemplary process for implementing the function merchant deployment function also shown in FIG. 5A.

An exemplary process for implementing the merchant deployment function is shown in FIG. 6. The process sends an approved merchant a form for identifying the terminals that are used to initiate transactions for a vendor's goods or services (block 400). The terminals may be POS terminals, PCs, smart cards, PDAs, wireless telephones, or other portable devices operated by store personnel, self-checkout terminals, ATMs, or kiosks. Upon receipt of the form, the data in the form are processed and stored in the merchant's data records in the registrant database (block 404). Another form for identifying authorized personnel and their requested passwords is sent to the merchant (block 408). Upon receipt of this form, the data contained in the form are processed (block 410). If any password is unacceptable as being too short, duplicative, or other valid security reason (block 414), the form is returned to the merchant for correction (block 418). Otherwise, the data are stored in the merchant's data records (block 420). These data may be stored in the merchant device being registered. Users of self-checkout counters, ATMs, or kiosks are not considered authorized terminal users. While such persons may use these devices to place an order, they cannot use the devices to update or modify data stored in the portal.

Figure 7:
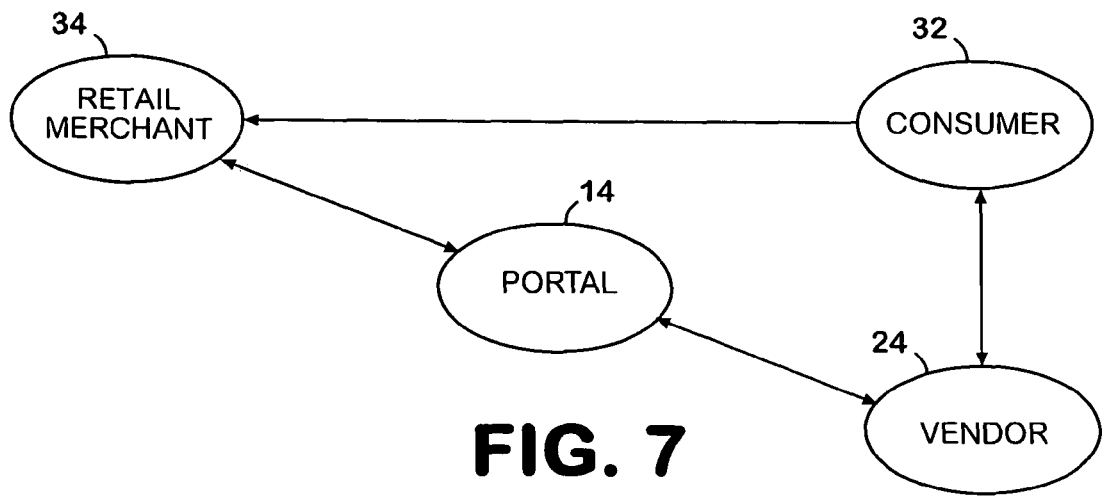
FIG. 7 is topological view of a data flow for consumer sales and payments on the business partner portal of FIG. 1.

FIG. 7 depicts data flow in support of a consumer sales function. The consumer sales function enables a consumer 32 to place an order for a vendor's goods or services with a vendor through the portal from an authorized terminal. From authorized terminals or portable devices at a retail merchant 34, an authorized user logins in to the portal 14 through the private party interface to initiate a transaction. A consumer 32 provides the authorized user with order detail and a method of payment. The method of payment may be a credit card, debit card, smart card, check, or cash. This portion of the transaction is performed in a known manner. That is, the payment from the consumer is deposited into the merchant's bank account or the like. The user selects the goods or services specified in the consumer's order from one of the vendors 24 that has approved the merchant as its agent. The terminal or portable device generates an order for the goods and services and the order is sent to the vendor(s) that provide the goods and services. The vendor 24 returns an order confirmation and a transaction amount to the terminal or portable device at the retail merchant 34. The terminal or portable device generates a receipt for the consumer and the consumer submits payment for the order.

Consumers may also use the system shown in FIG. 7 to place an order by coupling to the Internet to browse a website associated with a merchant 34. The website may be accessible through the public interface of the portal 14 or it may be operated by the merchant separately from the portal. The consumer may place an order for product or services with the website and obtain an order number from the website. The order is temporarily stored for some specified time. The consumer then takes the order number to the merchant's retail location where the consumer presents it to a cashier at a POS terminal, computer, or portable device, or the consumer may scan the order at a self-checkout terminal or kiosk. The order number is then used to retrieve the order stored in the system. The consumer may view and confirm the order and present payment for the order. The process then proceeds as outlined above with the authorized terminal or portable device being used to place the order with the vendor 24.

Vendors compensate the merchant for being an order agent in one of two ways. One way the merchant is compensated by a commission being deducted from the transaction amount and provided to the merchant. Another way for merchant compensation is to charge a user a transaction fee and the fee is itemized and added to the receipt. The manner of merchant compensation is determined by the terms of the distribution contract between the merchant and the vendor. The settlement of the transaction and the associated fees is set forth in more detail below. The communication of an order between a merchant and a vendor through the portal is managed by the order manager 88 in system 50, for example.

At an authorized kiosk, ATM, or self-checkout terminal, a consumer manipulates a cursor or menu to browse the goods and services of registered vendors presented through the public interface of the portal. Once a user determines what goods or services are to be purchased, the user indicates he or she is ready to submit an order. Again, the details of the order are provided to a vendor through the registered party interface of the portal so the portal verifies the registration of the device from which the consumer is placing the order. Details of the order are returned to the device so the user knows the transaction amount. The consumer is then prompted for payment. The user may present a credit card, a debit card, a smart card, check or cash. Devices accepting cash may be capable of returning change. A message confirming receipt of payment is sent to the vendor and the vendor returns an order confirmation message. A receipt is then printed for the consumer.

The payment received from a consumer is remitted by the merchant's bank to the portal's bank within a time period defined by the distribution contract. This remittance occurs whether the order is sent from a registered terminal or portable device operated by an authorized user or from a self-checkout station, kiosk, or ATM. The settlement of accounts and processing of the order is described more fully below.

Figure 8:
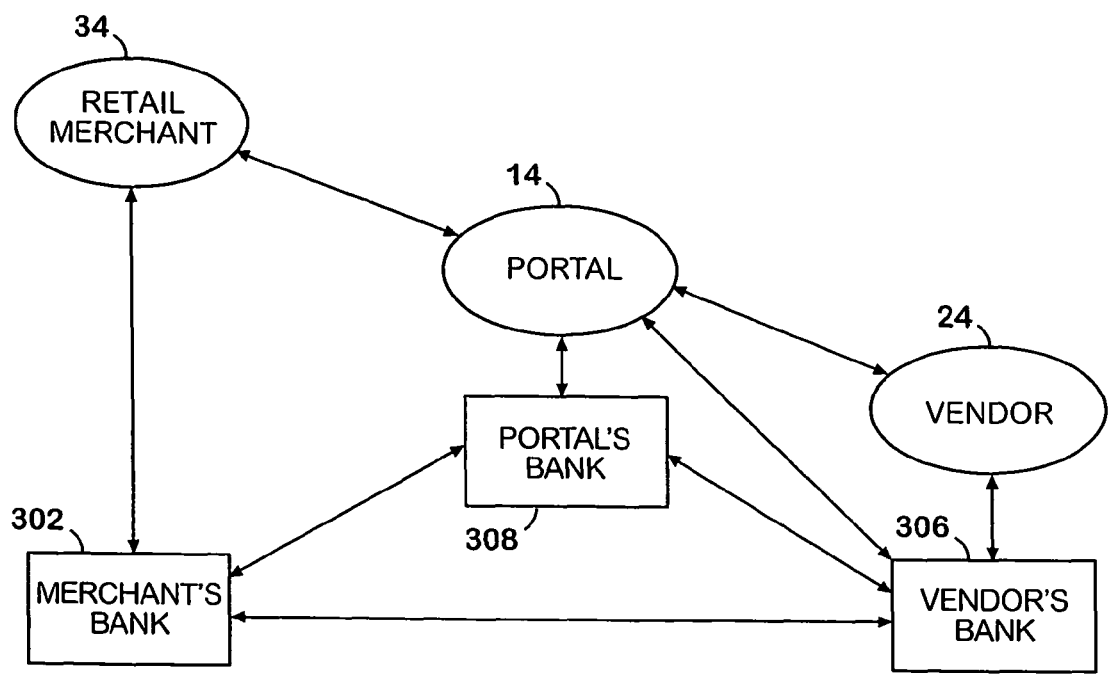
FIG. 8 is topological view of a data flow for transaction settlements, commission and/or convenience fee payment, and transaction reporting on the business partner portal of FIG. 1.

The settlement function prompts the appropriate financial institutions to generate EFT messages and communicate them through the ACH network to settle the transaction in accordance with the distribution contract between a vendor and a merchant. Once an order has been confirmed, the order manager stores a copy of the order in an order database. As shown in FIG. 8, the transaction manager of the portal 14 sends a message to the vendor's bank 306 to sweep the merchant's bank account at the appropriate interval for the transaction amount. The vendor's bank 306 accumulates transactions until the appropriate time for sweeping the merchant's account. Alternatively, the transaction manager may accumulate transactions and deliver a settlement file to a sponsoring bank, such as the portal's bank, on a periodic basis, for example, daily. Thus, either the portal's bank 308 or the vendor's bank 306 presents the accumulated transactions through an ACH network to the merchant's bank 302 and the funds are swept from the account at the merchant's bank 302, except for the fees or commissions, which remain in the merchant's bank as compensation to the merchant. The vendor bank 306 or the sponsoring portal bank 308 then sends a remittance message to the portal 14 to indicate payment has been received from the merchant's bank 302. The settlement function of the portal 14 then correlates the remittance advice with the transactions used to generate the EFT message to sweep the merchant's account. If the vendor's bank 306 swept the funds from the merchant bank 302, the transaction manager then updates the order to indicate payment has been received by the vendor and that the merchant has received the appropriate fee or commission. The transaction manager then accumulates completed transactions and sends a message to the portal's bank to generate an EFT message to sweep the vendor's bank for the portal's fees to handle completed transactions. A remittance message from the portal's bank is processed to determine whether a vendor has paid the portal's fees. If the portal's fees are not paid, the portal may suspend ordering activity for a vendor until the vendor brings the account up to date. Alternatively, If the portal bank 308 swept the funds from the merchant bank 302, the transaction manager then accumulates completed transactions and sends a message to the vendor's bank 306 to generate an EFT message to sweep the portal bank 308 for the vendor's price less the merchant's commissions and the portal's fees. Upon the processing of the sweep of the vendor's funds from the portal bank, the transaction manager is updated by the portal bank 308 to indicate the vendor has received the funds for a transaction.

The order manager receives order processing status data from a vendor. These data are used to update the order. These data include the date of order review, order filling, order shipment, and order receipt. A consumer may use a registered terminal or portable device to access the order and its status through the order manager. The consumer is able to retrieve information about an order using the identification data provided on the order confirmation receipt. Thus, a consumer is able to identify an order's status and the party responsible for its current status. For example, if a merchant has not remitted payment for an order to a vendor, the status of the order does not indicate it has been paid. Therefore, the consumer knows that the merchant is withholding payment and can inquire for the reasons for the withholding from the merchant.

The ratings function enables vendors to provide one another with information regarding the performance of merchants with respect to their contracts. By logging into the portal through the registered party interface, a vendor may communicate with the ratings manager to store ratings information in a ratings database. These data are available to the distribution contract manager so they may be delivered to a vendor evaluating business partner candidates. These ratings data may include whether the merchant timely pays for transactions, appropriately handles returns, or generates an expected sales volume.

The system and method described above address a number of limitations for previously known e-commerce systems and methods. For one, vendors may now select merchants and enter into distribution agreements without requiring in-person visits and direct sales calls. For another, cash may be used for payment in an electronic auction system with less risk. If an auction is a registered vendor, the auction may be conducted through the public interface of the portal or from the auction holder's website. The winner of the auction may be given an order confirmation receipt through the portal or the auction holder's website. The receipt also displays a deadline for completing the transaction with payment. The winner takes the receipt to a registered terminal or authorized merchant personnel with a portable device before the expiration of a posted deadline and presents payment, which can be made in cash. The payment is correlated with the order by the order manager. This transaction then follows the settlement function discussed above and the consumer is able to track the progress of the item bought through the auction.

With the system and method outlined above, a convenience store or a network of kiosks could submit application for approval as a sales agent to a telecommunications carrier. Using the process described above, the carrier is able to evaluate the store or kiosk operator and negotiate a distribution agreement. Once the merchant has been deployed, the merchant's kiosks, terminals or portable devices can be used to activate calling cards dispensed or purchased at the kiosk or store. The vendor also receives timely remittance for the call time.

A further advantage of the present system and method may be noted with continued reference to the calling card example. Once the consumer has purchased a calling card, an account number is established with the vendor-carrier. Although no personal information is associated with the account, transaction activity for the account is stored in the transaction data stored in the settlement database 92. If the consumer regularly increases time for the account with payments at registered terminals or portable devices associated with a merchant, a payment history is established for the account that the consumer has with the vendor-carrier. A bank may join the portal 14 as a vendor and pay a fee to search the settlement database to locate recurring account activity associated with one or more other vendors. Data ownership issues require that a vendor negotiate permission with another vendor to search the settlement database 92 for transactions associated with the permission-giving vendor. The permission negotiation may occur through the portal in a manner similar to the business partner negotiation discussed above or it may be negotiated in an offline manner and then communicated to the portal 14. The banking vendor may then generate search the transaction data associated with the carrier-vendor, for example, that is stored in the settlement database 92. The search terms for this type of search may include length of account that the account has existed, frequency of payments made to the account, average payment amount, and the number of different locations from which the payments were made. These search terms, for example, enable a banking vendor to access the settlement database through the registered party interface and build a buying habit profile from transaction data for account activity, and presumably the anonymous consumer behind the account. This profile may be used to determine the creditworthiness of a consumer from transactional activity that has occurred through the portal. The banking vendor may then generate advertising that is transmitted as a text and/or voice message to the account number, which in this case is a telephone number. The advertising solicits the consumer as a bank customer based on the consumer's payment history for the calling card, for example. Such a system and method would enable financial institutions and other vendors to identify and target for advertising, cash paying consumers who otherwise go undetected.

Figure 9:
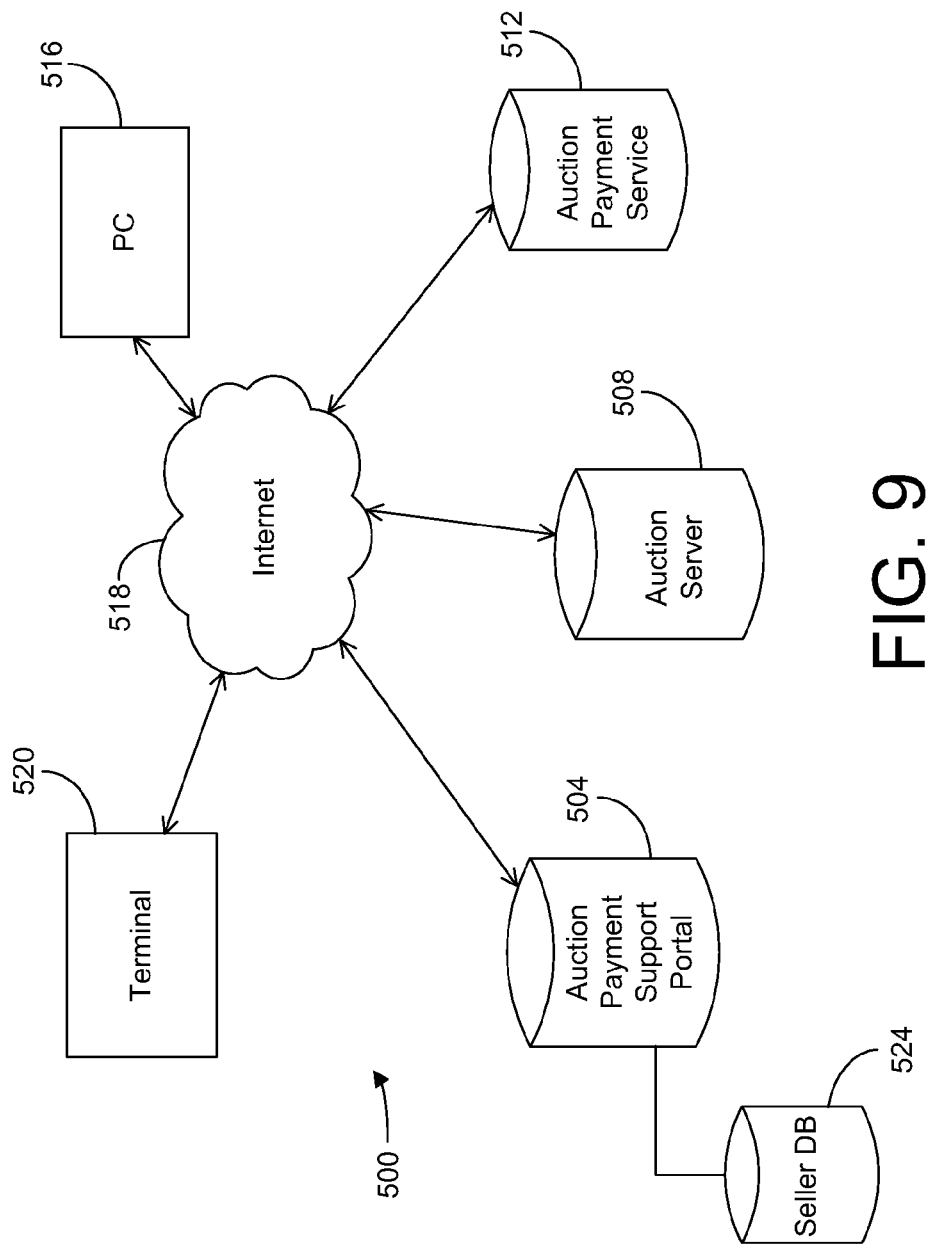
FIG. 9 is a block diagram of a system that uses an on-line auction payment support portal for enabling payment of items purchased in an on-line auction.

FIG. 9 shows a system 500 that implements an on-line auction and an on-line auction payment support system through registered merchant terminals. The system 500 includes an auction buyer payment support portal 504 that is coupled to a seller database 524, an auction server 508, an auction payment service server 512, a personal computer 516, and a registered merchant terminal 520. These components communicate with one another through the Internet 518. The auction server 508 is a server or group of servers that provide support for an on-line auction. Such systems are well-known with EBAY® being one such on-line auction. The auction payment service server 512 is a server or group of servers that enable winning buyers to pay sellers for items or services purchased through the auction. PAYPAL® is a known auction payment service that uses servers to handle the payment transactions for items won in an auction. To pay for an item through an auction payment service, a buyer must establish an account with the auction payment service. In order to establish an account, a potential buyer provides the auction payment service with identification of the buyer and a financial institution account. Thus, a buyer must expose personal and financial information to the auction payment service unless the buyer is willing to send a money order. A money order, however, is subject to a seller obtaining funds without sending the purchased goods. The auction buyer payment support server 504 enables a buyer to purchase goods through an on-line auction without having to expose personal or financial information and without having to assume risk of unauthorized redemption of a cash instrument.

A seller typically uses a personal computer 516 to communicate with the auction server 508 and make an item available for bidding. The seller also uses the computer 516 to establish an account for receiving payment from a buyer. The establishment of this account requires the seller to agree to pay a processing fee for the auction payment service handling the payment of an item. When the auction buyer payment support portal 504 disclosed herein is also coupled to the Internet, the seller may also register with the portal 504 so buyers may pay for auction items with cash. This capability increases the number of possible purchasers for items available through the auction. The increase in eligible bidders may also strengthen the bidding for items and produce higher prices for auction items. The seller uses information obtained from the auction server 508 to register with the auction buyer payment support portal 504. This information may include, for example, a seller's pseudonym, such as an EBAY® identifier, and banking information, such as an account number and routing transit number, or alternatively, an auction payment account number, such as a PAYPAL® account number. The reader should note that the auction server 508 and the auction buyer payment support portal are independent in the embodiment shown in FIG. 9. That is, no contractual or corporate relationship between the portal and the auction server is required for the support of auction buyers with the portal 504. Such a relationship may exist without departing from the description herein.

The registration of the seller with the portal 504 is supported as noted above with respect to the registration of merchants and vendors. More specifically, the seller enters the portal through a public open network interface to register for auction buyer payment support. The data associated with the seller, such as the exemplary data discussed above, are stored in the seller database 524. Once the seller has registered for the auction buyer payment support, the seller may include notice of the seller's willingness to use the auction buyer payment support service in the description of the goods on the auction server. Provision of the notice in this manner enables the portal 504 and the server 508 to remain independent.

The registered terminal 520 is a merchant registered terminal or kiosk as described above. A buyer goes to a location where a terminal or kiosk is available to tender payment for purchased items as described in more detail below. Merchants are encouraged to accept the tender of payments for auctioned items as a way of increasing traffic in their stores for other goods. Additionally, the auction buyer payment support portal operator may contract with the merchants to receive a fee for handling the payment transactions. The process for handling the payment transactions is discussed in more detail below.

Figure 10:
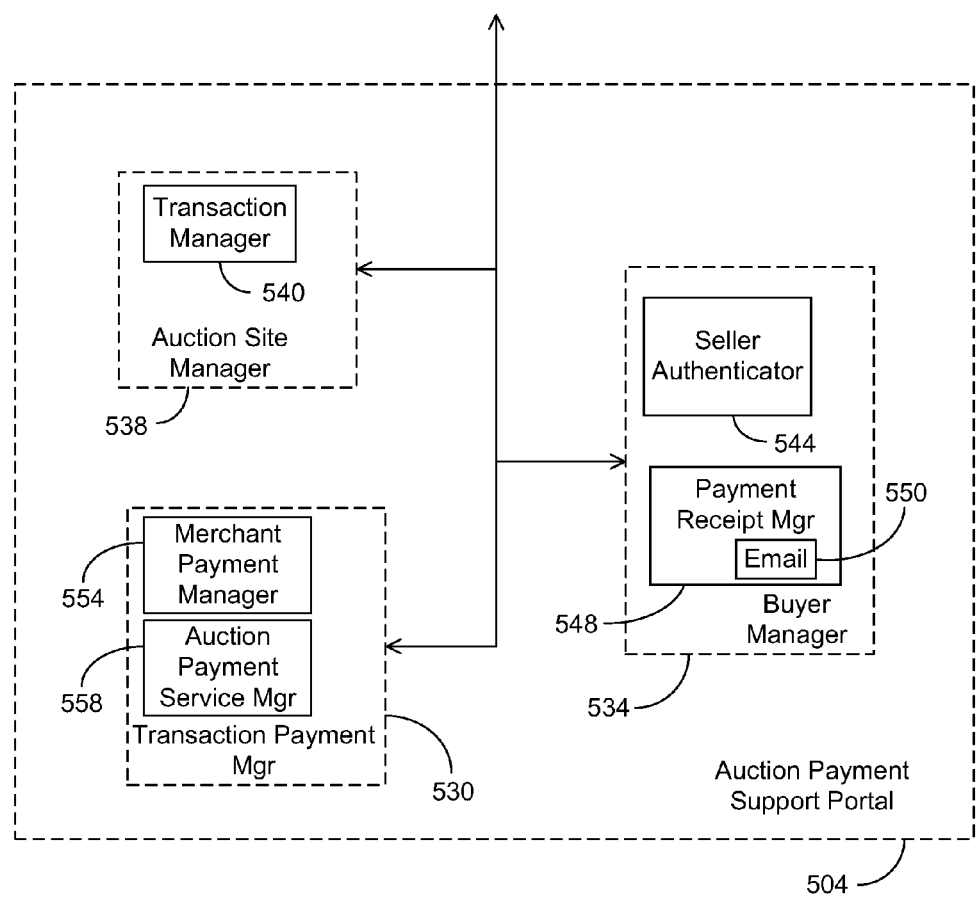
FIG. 10 is a block diagram of the on-line auction payment support portal shown in FIG. 9.

An exemplary implementation of the auction buyer payment support portal 504 is shown in FIG. 10. The portal 504 includes an auction site manager 538, a buyer manager 534, and a transaction payment manager 530. The auction site manager 538, buyer manager 534, and transaction payment manager 530 are comprised of one or more computers, each computer having one or more processors and adequate memory to support the functions described herein. The computers are configured with appropriate hardware and programmed instructions to implement the functions required to provide auction buyer payment support.

The buyer manager 534 verifies auction purchase data with the registered terminal 520. The auction purchase data are obtained from a buyer, who has won the bidding for an item that was placed on the auction server by a seller. The buyer obtains auction purchase data from the auction server 508, which typically emails a message to the winning buyer. The buyer manager 534 verifies, for example, that the seller identified by the auction purchase data is registered with the auction buyer payment support portal. If the seller authenticator 544 of the buyer manager 534 determines the seller is registered, the buyer manager generates an auction confirmation signal for the auction site manager 538, which responds as discussed below. The buyer manager 534 also includes a payment receipt manager that generates and sends a payment receipt to a buyer in response to confirmation that funds have been transferred to the seller's account with the auction payment service.

In response to the auction confirmation signal, the auction site manager 538 communicates with the auction server 508 to verify auction transaction data. The auction purchase data obtained from the buyer are communicated with the auction server 508 to verify the auction item, the winning bid, and the seller's pseudonym. The auction server 508 returns an auction transaction data confirmation signal indicating whether the buyer has submitted the winning bid for an item offered by the seller on the auction service and tha the auction purchase data are accurate. The auction server 508 also provides the auction site manager with the shipping method data and the costs associated with the purchase. In response to the auction server indicating that the buyer has submitted the winning bid and that the auction purchase data are accurate, a transaction manager 540 of the auction site manager generates a transaction approval form that is sent to the registered merchant terminal.

After reviewing the transaction approval form at the registered terminal, the buyer agrees the auction transaction data are accurate and submits payment. The registered terminal returns the approval form and indicates payment has been tendered. In response, the transaction payment service manager 530 communicates messages for transferring funds to the seller's account. In one embodiment, these messages are electronic funds transfer (EFT) messages, which are used to transfer the funds for paying the seller, the auction payment service, and the auction site operator. In another embodiment, the messages may be electronic messages instructing the transfer of funds from one account to another account outside an automated clearinghouse system, such as instructions to transfer funds from one auction service account to another auction service account as described in more detail below.

The transaction payment service manager 530 may also include a merchant payment manager 554 and an auction payment service manager 558. The merchant payment manager 554 generates and communicates electronic messages for transferring funds, such as EFT messages to sweep the registered merchant's account for the funds corresponding to the payment tendered by the buyer and deposit them in a financial account for the portal operator, or electronic instructions to transfer funds in a financial system outside an automated clearinghouse system. Likewise, the auction payment service manager 558 generates and communicates electronic messages for transferring funds, such as EFT messages to sweep funds from the financial account for the portal operator and deposit the funds in an auction service payment account that the portal operator has with the auction payment service. The auction payment service manager 558 may generate electronic instructions to distribute funds through a financial system outside an automated clearinghouse system, such as instructions to transfer funds from a portal's auction service account to a seller's account with the auction payment service. Data from the auction payment service is returned to the auction payment support portal and the payment receipt manager 550 of the buyer manager 534 generates a payment receipt for communication with the buyer.

Figure 11A:
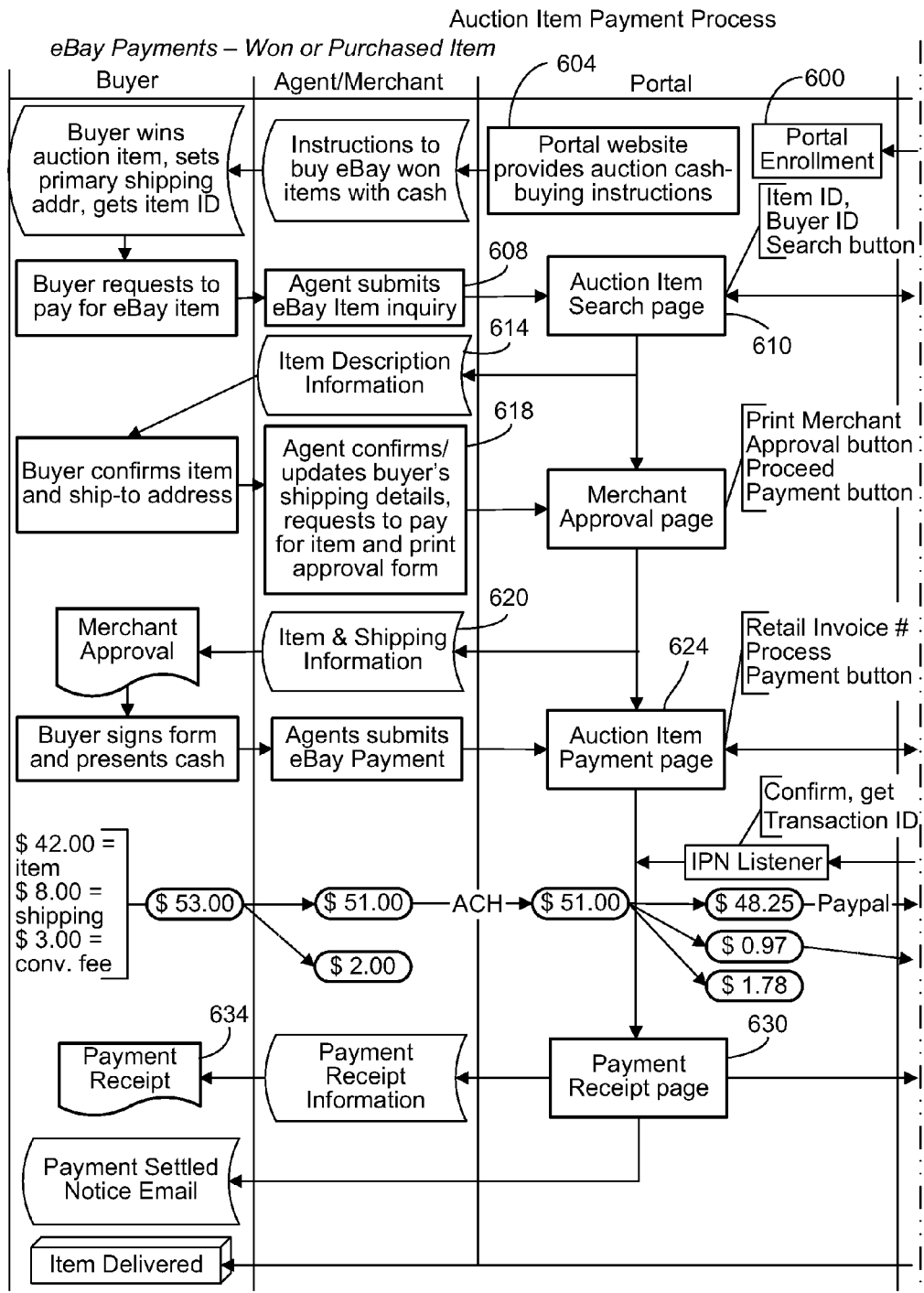
FIG. 11A and FIG. 11B are flow process diagrams depicting the process that may be implemented by the portal of FIG. 10.
Figure 11B:
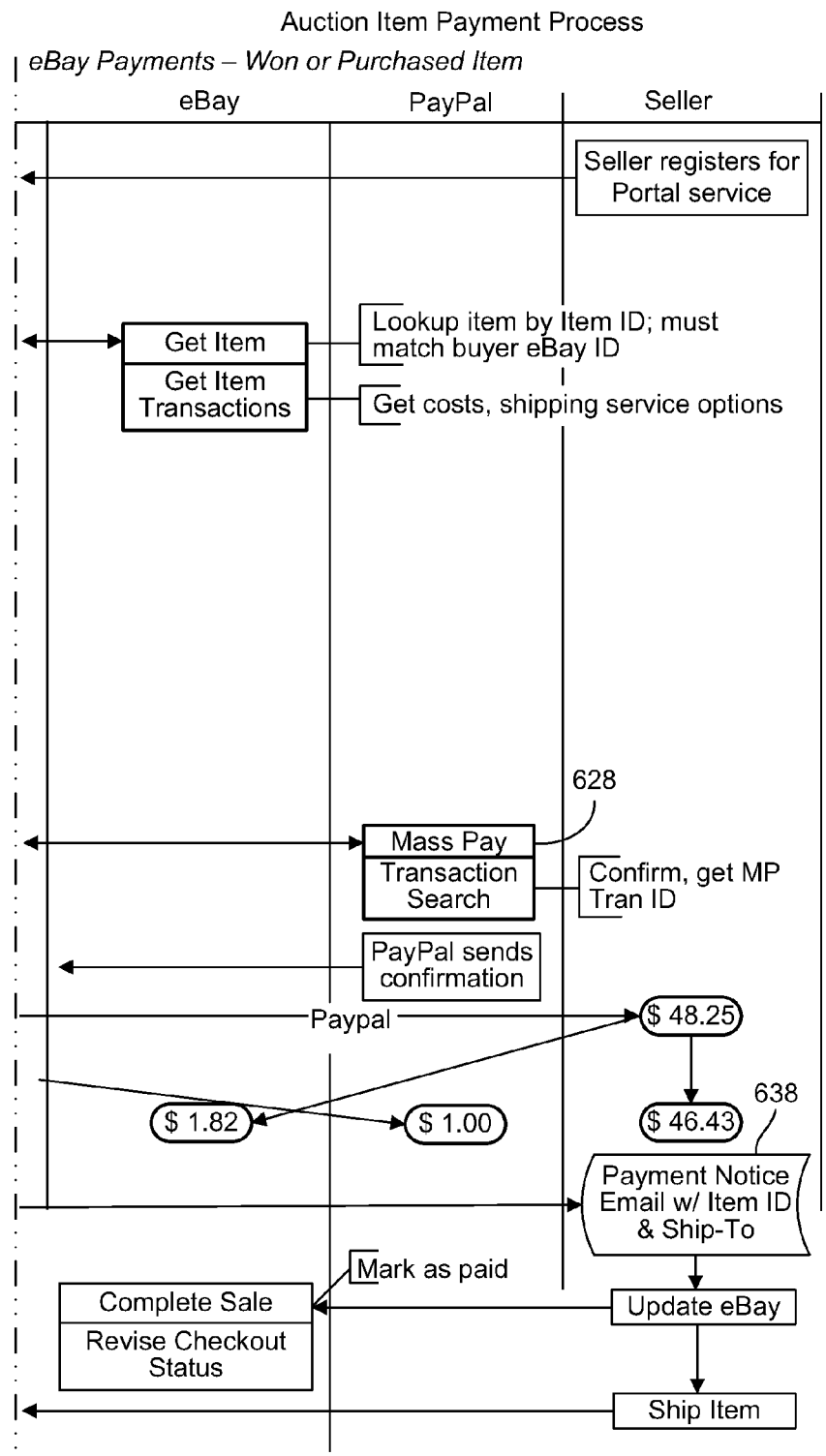

An exemplary process that may be implemented by the exemplary portal system described above is now described with reference to FIGS. 11A and 11B. After a seller has enrolled with the auction server 508 for selling an item through an on-line auction managed by the auction server 508, the seller may also enroll with the auction payment support portal 504 (block 600). The seller's enrollment data, which identifies the item being auctioned and the seller's pseudonym, are stored in the seller database 524. The buyer may learn about the option of buying with cash through the portal from the seller's notice on the auction server and through information available from the portal site through the public interface (block 604).

A winning buyer may use information obtained from the auction server 508 regarding the winning bid to submit cash payment for a purchased item. The buyer may go to a registered merchant terminal at a retail location or to a registered kiosk. Entering the identifying data obtained from the buyer into the registered terminal, the terminal generates a payment inquiry message that is sent to the auction payment support portal 504 for processing by the buyer manager 534 (block 608). After the seller authenticator 544 verifies the seller is registered with the portal, the auction site manager 538 communicates with the auction server 508 to verify the winning bid and buyer's pseudonym for the auction item. Upon verification of the buyer submitted data, the auction site manager site 538 also queries the auction server 508 for the shipping method and costs for the transaction. The transaction manager 540 of the auction site manager 538 generates a transaction approval form with the data and sends the form to the registered terminal (block 614). The buyer then confirms the transaction data in the form (block 618). The confirmed transaction approval form is returned to the portal 504 and the buyer manager generates a payment form (block 620). The payment form identifies the transaction total, which includes the purchase price of the item, the shipping and other associated costs, and a convenience fee for the portal operator. After the buyer tenders funds to the merchant to pay for the transaction, the merchant takes the funds for deposit in the merchant's financial account. The merchant then approves the payment form and returns it to the portal. The transaction manager 540 of the auction site manager generates an open transaction record to track payment to the seller (block 624).

The transaction payment manager 530 of the portal 504 processes an open transaction record to move funds for the transaction. The merchant payment manager 554 of the transaction payment manager 530 generates and communicates electronic messages for funds distribution, which, in the example being discussed, are EFT messages for sweeping the merchant's financial account of the funds received from buyers. These EFT messages may be generated and communicated through an automated clearinghouse on a periodic basis. By agreement with the registered merchant, the EFT messages may leave a portion of the convenience fee in the merchant's financial account for operating as a payment station. The funds swept from the merchant's account are deposited in the portal operator's financial account. The merchant payment manager also generates electronic messages for transferring funds to an auction payment service account. In the scenario depicted in the figure, the messages are electronic messages that deposit funds in an auction account for the portal operator that is maintained with the auction payment service. These electronic messages also include instructions to push payment from the portal operator's auction account to the seller's auction account. "Push payment" refers to the messages that initiate and effect payment between parties to complete a transaction.

In response to an open transaction record being generated, the auction payment service manager 558 generates instructions that are sent to the auction payment service. These instructions identify auction transactions and the amounts to be paid. The funds to cover the item and its shipping costs are transferred from the portal operator's auction payment service account to the seller's account with the auction payment service (block 628). After these transfers, the payment receipt manager 548 receives confirmation that the instructions have been executed. The payment receipt manager 548 generates a payment receipt message that is returned to the registered terminal (block 630). The payment receipt message may be printed by the terminal and given to the buyer as evidence of the payment in the event that the seller does not send the auctioned item as promised (block 634). The auction payment service also transfers funds to the auction payment service's financial account for its service fee and transfers funds to the auction operator's financial account for its service fee.

After receipt of the confirmation that the payment instructions have been executed, the payment receipt manager 548 generates and sends a payment notification message to the seller's email address using an email manager 550, although other communication methods may be used (block 638). The seller may then verify that the seller's account with the auction payment service has been credited. The seller then communicates using the computer 516 to update the auction server 508 that payment for the auctioned item has been received. The seller then ships the item to the buyer.

In one embodiment of the auction payment support portal, the auction server is an eBay server and the auction payment service server is a PAYPAL® server. The portal operator maintains a PAYPAL® account with the PAYPAL® payment service for the payment of funds to seller accounts. The EBAY® server and the auction payment service server have an interface known as EBAY® Web Services Application Programming Interface. The communication protocol for auction transaction messages, submitting payment instructions, and receiving payment confirmation messages is defined for this embodiment by the specification for this interface that is available from EBAY®. The portal 504 uses this protocol and the defined message structures, particularly, those using the MASSPAY® method, to implement an auction payment support for preserving the security of a buyer's personal and financial information. Other communication protocols, methods, and message structures may be used for other auction servers.

From the foregoing, the reader may discern that the auction payment support portal enables a buyer to be identified only by the pseudonym that the buyer used to win the auction. The buyer was not required to expose personal or financial information in order to make the purchase as payment was tendered in cash at a registered terminal. Of course, the registered terminal may also be operated to accept credit, debit, or smart card payment should the buyer want to use those methods. The buyer's anonymity is preserved at the expense of the small convenience fee charged by the portal operator.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An auction buyer payment support system comprising:
   an open network interface configured to communicate electronic data messages with other computers over an open network;
   a seller database having a processor and memory in which data associated with a seller are stored; and
   one or more computers operatively connected to the open network interface and the seller database, the one or more computers being programmed with instructions stored on at least one hard drive associated with at least one computer of the one or more computers to enable:
   a buyer manager software module executing on the one or more computers to verify a merchant terminal communicating with the buyer manager through the open network interface is registered with the auction buyer payment support system, and to verify auction purchase data for a concluded auction purchase received from the merchant terminal, the auction purchase data being associated with an auction buyer of the concluded auction purchase and communicated in a data message sent from the merchant terminal to the one or more computers through the open network interface;
   an auction site manager software module executing on the one or more computers to communicate with an auction server associated with the concluded auction purchase through the open network interface to verify that auction transaction data in the auction purchase data received from the merchant terminal corresponds with auction transaction data for the concluded auction purchase stored in a memory associated with the auction server; and
   a transaction payment service manager software module executing on the one or more computers to communicate data messages with an auction payment service server through the open network interface to transfer funds from an account associated with a merchant associated with the merchant terminal to an account associated with the seller for payment of the concluded auction purchase corresponding to the verified auction transaction data without identifying financial account data associated with the auction buyer.

2. The system of claim 1 further comprising:
   a seller authenticator software module of the buyer manager software module that executes on the one or more computers to compare seller data obtained from the auction server with seller data stored in the seller database and generate an auction confirmation signal in response to the seller data obtained from the seller database corresponding with the seller data obtained from the auction server; and
   the auction site manager software module executing on the one or more computers verifies the auction transaction data in response to the auction confirmation signal and generates a transaction approval form for transmission to the merchant terminal in response to the auction purchase data being verified by the auction server.

3. The system of claim 2, the auction site manager software module executing on the one or more computers further comprising:
   a transaction manager software module that executes on the one or more computers to generate an open transaction record in response to receipt of an approved transaction approval form received from the merchant terminal.

4. The system of claim 3, the transaction payment service manager software module executing on the one or more computers further comprising:
   a merchant payment manager software module that executes on the one or more computers to generate and communicate through the open network interface electronic messages for effecting funds transfers to an account associated with the auction buyer payment support system from the account associated with the merchant to enable payment for the verified auction purchase without use of financial account data associated with the auction buyer; and
   an auction payment service manager software module that executes on the one or more computers to generate payment instruction messages for transferring funds to the account associated with the seller through the auction payment service to enable the payment of the concluded auction purchase without identifying financial account data associated with the auction buyer.

5. The system of claim 4, the buyer manager software module that executes on the one or more computers further comprising:
   a payment receipt manager software module that executes on the one or more computers to generate payment receipt messages in response to payment acknowledgement messages received through the open network interface from the auction payment service server and to communicate the payment receipt messages to the merchant terminal through the open network interface.

6. The system of claim 5, the payment receipt manager software module that executes on the one or more computers further comprising:
   an email message manager software module that executes on the one or more computers to send payment notification messages to seller email addresses.

7. The system of claim 4 wherein the merchant payment manager software module that executes on the one or more computers also generates and communicates electronic messages for transferring funds to the account associated with the auction buyer payment support system with the auction payment service; and
   the auction payment service manager software module that executes on the one or more computers also generates and communicates through the open network interface payment instructions for pushing funds from the account associated with the auction buyer payment support system with the auction payment service to the account associated with the seller.

8. The system of claim 7 wherein the payment instructions are configured to cause a computer associated with an auction payment service to provide a predetermined auction payment service method and the account associated with the seller is accessed through the auction payment service.

9. A method for operating a computer network system having one or more computers to provide auction buyer payment support comprising:
   storing with the one or more computers of the computer network system data associated with a seller in a database that is coupled to the one or more computers of the computer network system;
   verifying with the one or more computers of the computer network system that seller data in auction purchase data for a concluded auction purchase received from a merchant terminal that is registered with the computer network system corresponds with data retrieved from the database coupled to the one or more computers of the computer network system;

verifying with the one or more computers of the computer network system that auction transaction data in the auction purchase data for the concluded auction purchase received from the merchant terminal corresponds with auction transaction data for the concluded auction purchase stored in a memory at an auction server through communication of data messages between the one or more computers and the auction server; and communicating data messages without identifying financial account data associated with an auction buyer between the one or more computers of the computer network system and an auction payment service server to transfer funds to the seller corresponding to the auction purchase data received from the merchant terminal for the concluded auction purchase corresponding to the verified auction purchase data.

10. The method of claim 9, the auction purchase data verification further comprising:

receiving at the one or more computers of the computer network system an auction transaction data confirmation signal in response to the auction transaction data in the auction purchase data received by the one or more computers of the computer network system corresponding to auction transaction data stored at the auction server;

generating with the one or more computers of the computer network system a transaction approval form in response to the auction transaction data confirmation signal being received; and sending the transaction approval form from the one or more computers of the computer network system to the merchant terminal.

11. The method of claim 10 further comprising:

generating with the one or more computers of the computer network system an open transaction record in response to receipt of a payment received signal from the merchant terminal.

12. The method of claim 9 further comprising:

generating and communicating a first plurality of electronic messages with the one or more computers of the computer network system, the first plurality of electronic messages transferring funds to an account associated with an operator of the computer network system from an account associated with the merchant terminal; and generating and communicating a second plurality of electronic messages with the one or more computers of the computer network system, the second plurality of electronic messages transferring funds to an account associated with an auction payment service from the account associated with the operator of the computer network system.

13. The method of claim 12 further comprising:

generating with the one or more computers of the computer network system payment receipt messages in response to payment acknowledgement messages received from the auction payment service server; and communicating the payment receipt messages from the one or more computers of the computer network system to the merchant terminal.

14. The method of claim 13 further comprising:

sending the payment receipt messages as email messages from the one or more computers of the computer network system to an email address associated with a seller.

15. The method of claim 12 wherein the generation and communication of the second plurality of electronic messages that transfers funds to the account associated with the auction payment service from the account associated with the operator of the computer network system transfers funds to an account associated by the auction payment service with the operator of the computer network system; and the method further comprises:

generating and communicating payment instructions with the one or more computers of the computer network system, the payment instructions are configured to push funds from the account associated with the operator of the computer network system by the auction payment service to an account associated with a seller by the auction payment service.

16. The method of claim 12 further comprising:

generating and communicating payment instructions with the one or more computers of the computer network system that push funds using a method supported by the auction payment service.

17. A system for implementing transactions between a registered terminal at a merchant location and a vendor comprising:

a registered terminal at a location associated with a merchant that is registered with a computer network system of one or more computers, the registered terminal including a memory in which data are stored that verify registration of the terminal with a computer network system of one or more computers;

a seller database having a memory in which data associated with sellers are stored;

the one or more computers of the computer network system being communicatively coupled to the seller database and to the registered terminal and programmed with instructions stored in a memory for a buyer manager software module that executes on the computer network system to verify seller data in auction purchase data for a concluded auction purchase received from the registered terminal corresponds to seller data stored in the seller database;

the one or more computers of the computer network system also being programmed with instructions stored in a memory for an auction site manager software module that executes on the computer network system to verify the auction purchase data received from the registered terminal corresponds with auction purchase data stored in a memory associated with an auction server communicatively coupled to the computer network system; and the one or more computers of the computer network system also being programmed with instructions stored in a memory for a transaction payment service manager software module that executes on the computer network system to communicate data messages with an auction payment service server to transfer funds electronically for the concluded auction purchase that corresponds to the verified auction purchase data without identifying financial account data associated with an auction buyer.

18. The system of claim 17, the one or more computers of the computer network system programmed with instructions stored in a memory for the transaction payment manager software module including instructions for a merchant payment manager software module that executes on the computer network system to generate and communicate electronic messages that transfer funds from a merchant account to an account associated with the computer network system by the auction payment service server; and the one or more computers of the computer network system programmed with instructions stored in a memory for the transaction payment manager software module also including instructions for an auction payment service manager software module that executes on the computer network system to generate and communicate electronic payment instructions that push funds from the account associated with the computer network system by the auction payment service server to an account associated with a seller corresponding to seller data in the seller database by the auction payment service server.

19. The system of claim 18 wherein the electronic payment instructions cause a computer associated with a payment service to implement a method for a payment service to push funds from the account associated with the computer network system by the auction payment service server to the account associated with the seller by the auction payment service server.

* * * * *